US011220256B2

(12) United States Patent
Jeong et al.

(10) Patent No.: US 11,220,256 B2
(45) Date of Patent: Jan. 11, 2022

(54) ELECTRONIC DEVICE INCLUDING SPHERICAL STRUCTURE

(71) Applicant: Samsung Electronics Co., Ltd., Gyeonggi-do (KR)

(72) Inventors: Eunsu Jeong, Gyeonggi-do (KR); Woochul Lee, Gyeonggi-do (KR); Byunghun Cho, Gyeonggi-do (KR); Hyoseok Na, Gyeonggi-do (KR); Yongsang Yun, Gyeonggi-do (KR); Hochul Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 169 days.

(21) Appl. No.: 16/751,780

(22) Filed: Jan. 24, 2020

(65) Prior Publication Data
US 2020/0238977 A1    Jul. 30, 2020

(51) Int. Cl.
*B60W 30/02* (2012.01)
*G05D 1/00* (2006.01)
(Continued)

(52) U.S. Cl.
CPC ............ *B60W 30/02* (2013.01); *B60W 50/14* (2013.01); *G05D 1/0016* (2013.01);
(Continued)

(58) Field of Classification Search
USPC ......................................................... 701/23
See application file for complete search history.

(56) References Cited

U.S. PATENT DOCUMENTS 9,725,158 B2 *   8/2017   Yan ..................... B64C 39/024
9,905,964 B2 *   2/2018   Degner .............. H01R 13/6205
(Continued)

FOREIGN PATENT DOCUMENTS

CN        1302717        7/2001
KR     1020100110188    10/2010
(Continued)

OTHER PUBLICATIONS

International Search Report dated Mar. 13, 2020 issued in counterpart application No. PCT/KR2020/001234, 7 pages.

*Primary Examiner* — Tyler D Paige
(74) *Attorney, Agent, or Firm* — The Farrell Law Firm, P.C.

(57) ABSTRACT

An electronic device including a first device having a spherical housing, and a second device arranged on a surface of the spherical housing, wherein the first device includes a first driving device arranged in the spherical housing and configured to deliver power to the spherical housing, a structure arranged in the spherical housing and configured to arrange the second device on a surface of the spherical housing, a second driving device configured to trigger a movement of the structure, a processor electrically connected with the first driving device and the second driving device, and a memory operatively connected with the processor, wherein the memory is configured to store instructions that, when executed, enable the processor to control the second driving device to, in response to identifying a coupling of the second device with the first device, adjust an arrangement direction of the second device with respect to the first driving device.

20 Claims, 24 Drawing Sheets

(51) Int. Cl.
*B60W 50/14* (2020.01)
*A63H 33/00* (2006.01)
*B25J 11/00* (2006.01)
*B25J 9/12* (2006.01)

(52) U.S. Cl.
CPC . *B60W 2050/143* (2013.01); *B60W 2050/146* (2013.01); *B60W 2420/42* (2013.01)

(56) References Cited

U.S. PATENT DOCUMENTS

| | | | |
|---|---|---|---|
| 9,968,864 B2* | 5/2018 | Clarke | A63H 33/005 |
| 10,799,806 B2* | 10/2020 | Sasagawa | A63H 11/00 |
| 2012/0168241 A1* | 7/2012 | Bernstein | G05D 1/0212 |
| | | | 180/167 |
| 2015/0224941 A1* | 8/2015 | Bernstein | A63H 33/005 |
| | | | 180/167 |
| 2017/0012482 A1* | 1/2017 | Bandera | H02K 1/27 |
| 2017/0239982 A1* | 8/2017 | Fontaine | B60C 11/00 |
| 2020/0238977 A1* | 7/2020 | Jeong | B60W 50/14 |
| 2020/0262061 A1* | 8/2020 | Jeong | B25J 11/0005 |

FOREIGN PATENT DOCUMENTS

| | | |
|---|---|---|
| KR | 1020110132745 | 12/2011 |
| KR | 101180872 | 9/2012 |
| KR | 20180070089 | 6/2018 |

* cited by examiner

ELECTRONIC DEVICE INCLUDING SPHERICAL STRUCTURE

CROSS-REFERENCE TO RELATED APPLICATION(S)

This application is based on and claims priority under 35 U.S.C. § 119 to Korean Patent Application No. 10-2019-0009277, filed on Jan. 24, 2019, in the Korean Intellectual Property Office, the disclosure of which is incorporated by reference herein in its entirety.

BACKGROUND

1. Field

The present disclosure relates to an electronic device including a spherical structure.

2. Description of Related Art

Various types of electronic devices (e.g., robots) which perform operations complying with commands of family members and make an emotional exchange with a user in a smart home environment are being used.

For example, as an electronic device, a fixed home robot operating in a form of being put on a table or attached to a wall, or a mobile home robot able to move in a house by a driving unit (e.g., a wheel) coupled to a main part of a body, is being used.

Recently, a fixed home robot or a mobile home robot is providing an evolved smart home environment by a combination of an artificial intelligence technology of performing its own thinking, learning, etc. and a computer program. By virtue of the development of technologies such as semiconductor technology, a deep learning/machine learning algorithm, etc., an electronic device (e.g., a robot) are able to have a faster processing speed or a higher data processing amount. Accordingly, an electronic device (e.g., a robot) employing deeper artificial intelligence technology are able to be provided to the public.

An electronic device may include a spherical mobile device and a second device arranged thereon. The spherical mobile device may include a spherical housing and an internal driving device arranged in the spherical housing. The spherical housing may be rotated by the internal driving device and, by this, the electronic device may move. By moving the spherical mobile device while utilizing the second device arranged on the spherical mobile device, the electronic device may provide a corresponding function or service.

When the second device is arranged on the spherical mobile device, it is difficult for the electronic device to recognize an arrangement direction of the second device with respect to the spherical mobile device and, thus, there may be a limit of use of having to arrange the second device in a direction which is set with respect to the spherical mobile device. If the second device is not arranged in the direction which is set with respect to the spherical mobile device, it may be difficult for the electronic device to perform a function or service provision which uses an element requiring directivity such as a camera arranged in the second device, or may cause an error in an operation thereof.

SUMMARY

An aspect of the present disclosure provides an electronic device including a second device, and a method for adjusting an arrangement direction of the second device with respect to a spherical mobile device.

According to an aspect of the present disclosure, an electronic device is provided. The electronic device includes a first device including a spherical housing, and a second device arranged on a surface of the spherical housing, wherein the first device further includes a first driving device arranged in the spherical housing and configured to deliver power to the spherical housing, a structure arranged in the spherical housing and configured to arrange the second device on a surface of the spherical housing, a second driving device configured to trigger a movement of the structure, a processor electrically connected with the first driving device and the second driving device, and a memory operatively connected with the processor, wherein the memory is configured to store instructions that, when executed, enable the processor to control the second driving device to, in response to identifying a coupling of the second device with the first device, adjust an arrangement direction of the second device with respect to the first driving device.

In accordance with another aspect of the present disclosure, an electronic device is provided. The electronic device includes a first device including a spherical housing, and a second device arranged on a surface of the spherical housing, wherein the first device further includes a first driving device arranged in the spherical housing and configured to deliver power to the spherical housing, a structure arranged in the spherical housing and configured to arrange the second device on a surface of the spherical housing, a second driving device configured to trigger a movement of the structure, and a plurality of first magnets arranged in the structure, wherein the second device includes a ring shaped housing arranged along the spherical housing, and a plurality of second magnets arranged in the ring shaped housing along a surface of the spherical housing, wherein the structure is further configured to move together with the second device, due to an attractive force or a repulsive force between the plurality of first magnets and the plurality of second magnets, and wherein some of the plurality of first magnets are arrayed at an interval different from that of other portions of the plurality of first magnets.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
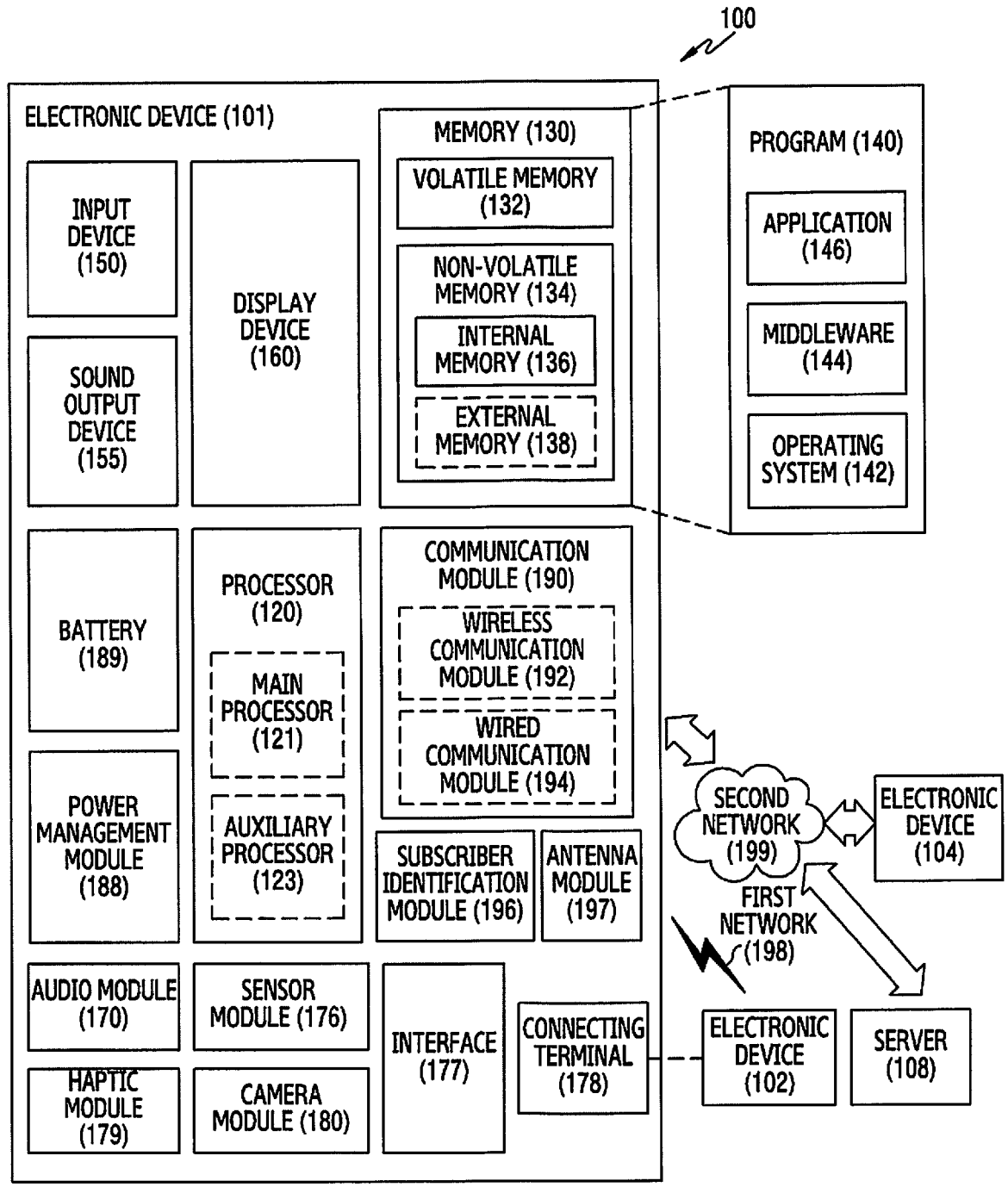
FIG. 1 is a block diagram of an electronic device of a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or a software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for incoming calls. According to an embodiment, the receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, the hologram device, and the projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain sound via the input device 150, or output sound via the sound output device 155 or a headphone of the electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the electronic device 102. According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus. (e.g., a vibration or a movement) or an electrical stimulus which may be recognized by a user via tactile sensation or kinesthetic sensation. According to an embodiment, the haptic module 179 may include, for example, a motor, a piezoelectric element, or an electrical stimulator.

The camera module 180 may capture a still image or moving images.

According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108 and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single integrated circuit or chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in, or on, a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 101 and the external electronic device 104 via the server 108 coupled with the second network 199. Each of the electronic device 102 and the electronic device 104 may be a device of a same type as, or a different type from, the electronic device 101. According to an embodiment, all or some operations to be executed at the electronic device 101 may be executed at one or more of the external electronic device 102, the external electronic device 104, or the external server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of performing a function or service to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer, a portable multimedia device, a portable medical device, a camera, a wearable device, or a home appliance. According to an embodiment of the present disclosure, the electronic devices are not limited to those described above.

It should be appreciated that various embodiments of the present disclosure and the terms used therein are not intended to limit the present disclosure but include various changes, equivalents, or replacements. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$," "2nd," "first," and "second" may be used to simply distinguish a corresponding component from another component, but does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may be used interchangeably with other terms, for example, "logic," "logic block," "part," or "circuitry". A module may be a single integral component, or a minimum unit or part thereof, adapted to perform one or more functions. For example, according to an embodiment, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the one or more instructions, with or without using one or more other components under the control of the processor. This allows the machine to be operated to perform at least one function according to the at least one instruction invoked. The one or more instructions may include code generated by a complier or code executable by an interpreter. The machine-readable storage medium may be provided in the form of a non-transitory storage medium. Wherein, the term "non-transitory" simply indicates that the storage medium is a tangible device, but does not include a signal (e.g., an electromagnetic wave), where this term does not differentiate between where data is semi-permanently stored in the storage medium and where the data is temporarily stored in the storage medium.

A method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
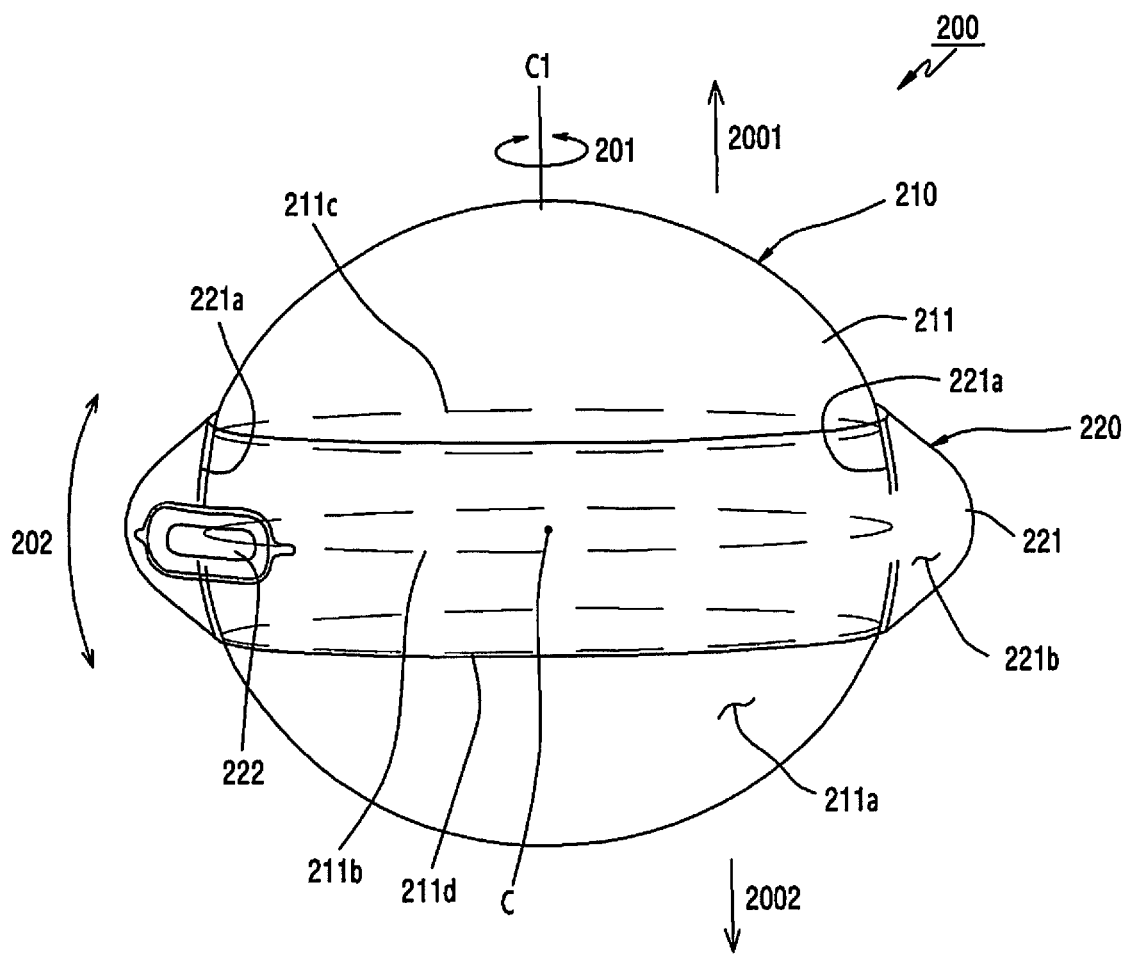
FIG. 2A is a perspective view of an electronic device according to an embodiment.
Figure 2B:
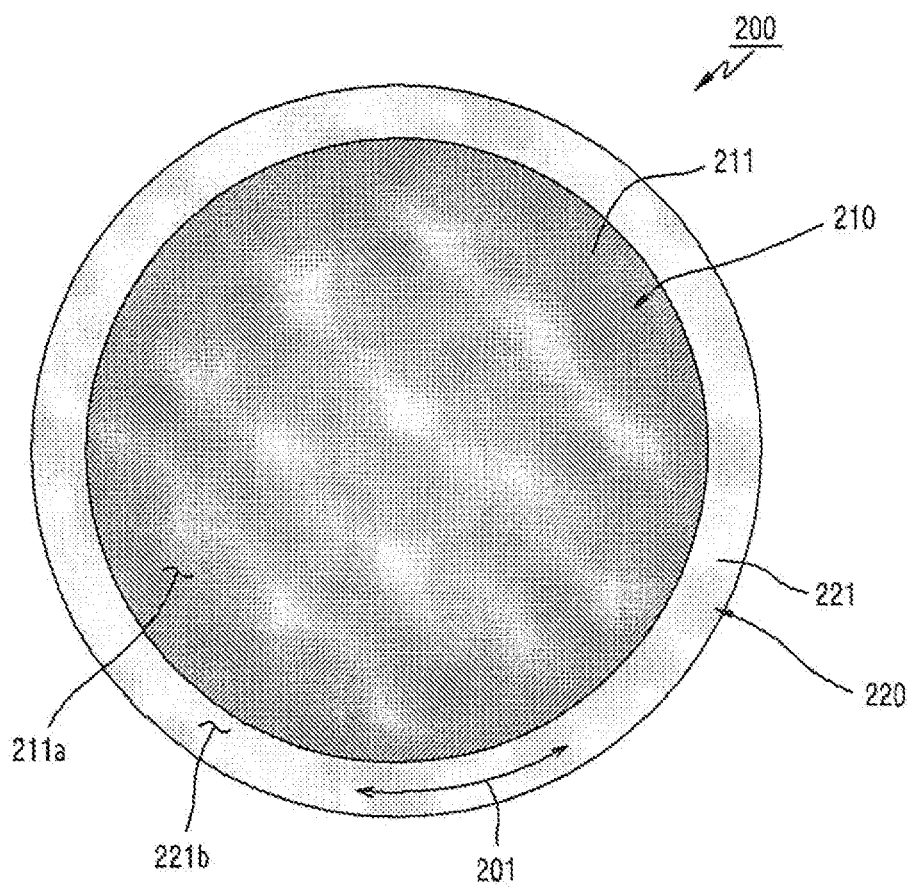
FIG. 2B is a plane view of the electronic device of FIG. 2A according to an embodiment.

FIG. 2A is a perspective view of an electronic device 200 according to an embodiment. FIG. 2B is a plane view of the electronic device 200 of FIG. 2A according to an embodiment.

Referring to FIGS. 2A and 2B, the electronic device 200 (e.g., the electronic device 101 of FIG. 1) may include a first device 210 and a second device 220. The first device 210 may have a spherical appearance, and may trigger a rolling motion of the first device 210 to move the electronic device 200 into position. The first device 210 may be denoted as a spherical mobile device. The second device 220 may be arranged on a surface of the first device 210 and move on the first device 210 by the control of the electronic device 200.

The first device 210 may include a first housing 211 and a driving device (or internal driving device) arranged in the first housing 211. The driving device, e.g., a device for moving an appliance or a power appliance, may include a first driving device for delivering power (or output torque) to the first housing 211. The first housing 211 may be rotated by the first driving device, and the first device 210 may be moved by the rotation of the first housing 211. The first housing 211 may be connected with the first driving device in various schemes.

The first device 210 may be moved using a gravity center shift (e.g., barycenter offset (BCO)). The gravity center shift may indicate an operation of shifting the center of gravity of the first device 210 in order to produce a necessary motion in the first device 210. For example, assuming that the first device 210 is in an equilibrium state, in response to the first driving device arranged in the first housing 211 being moved along the first housing 211, a mass distribution of the first device 210 may be shifted, and the first device 210 may roll to find a new equilibrium position.

The first device 210 may include at least one wheel which is connected with the first driving device and gets in contact with an inner surface (or internal wall) (e.g., inner spherical surface) of the first housing 211. By a frictional force of a contact surface between the wheel and the first housing 211, power (or movement) may be delivered from the wheel to the first housing 211. For example, in response to the first driving device rotating the wheel, power may be delivered from the wheel to the first housing 211 and, thus, the first housing 211 may be rotated. The first device 210 may include a control circuit (or control device) (e.g., the processor 120 of FIG. 1) which is included in the first driving device or is electrically connected with the first driving device. The control circuit may control the first driving device. Accordingly, a rotation direction, a rotation angle, a rotation amount, a rotation speed, a rotational acceleration or a rotating angular speed for the rotation of at least one wheel may be adjusted and, thus, a motion (or movement) of the first device 210 may be controlled. In addition, the first device 210 may be implemented as various other mechanisms capable of triggering a motion (e.g., a rolling motion, a rotation motion, or a supporting motion) of the first housing 211. The first driving device may be controlled wherein the first housing 211 takes the rolling motion or the rotation motion and, thus, is shifted in position. The first driving device may be controlled wherein the first housing 211 takes the rotation motion in its place. The first driving device may be controlled for the sake of the supporting motion for preventing a movement of the first housing 211. For example, the first driving device may control the wheel wherein the first housing 211 is not moved by an external force, and, thus, may support the supporting motion of the first housing 211. For example, the first driving device may control the wheel wherein the first housing 211 does not roll down from an inclined surface and, thus, may support the supporting motion of the first housing 211.

The first device 210 may control the first driving device based on the instructions or program 140 stored in a memory 130 included in the first device 210 or the second device 220. For example, the first device 210 may control the first driving device based on a signal (or input) received from the electronic device 102, the electronic device 104, or the server 108, or data (or a value) acquired from at least one sensor (e.g., the sensor module 176) (e.g., an acceleration, gyro or geomagnetic related sensor) arranged in at least one of the first device 210 or the second device 220. Thus, a rotation direction, a rotation angle, a rotation amount, a rotation speed, a rotational acceleration or a rotating angular speed for the rotation of at least one wheel may be adjusted.

The second device 220 may be a ring form which is arranged on a spherical surface (or first surface) 211a of the first housing 211. For example, the second device 220 may include a second housing 221 which has an inner circumference surface (or second surface) 221a facing the spherical surface 211a of the first housing 211 and not exposed to externally, and an outer circumference surface (or third surface) 221b exposed to externally and forming a part of an appearance of the electronic device 200. The inner circumference surface 221a may be arranged along a great circle 211b (e.g., a circumference formed by the meeting between a plane passing the center (C) of a sphere and the spherical surface 211a) of the first housing 211. The inner circumference surface 221a may include a curved surface which covers between a first small circle 211c (e.g., a circumference formed by the meeting between a plane not passing the center (C) of the sphere and the spherical surface 211a) of the first housing 211 and a second small circle 211d of the first housing 211. The first small circle 211c is spaced apart in parallel in a first direction 2001 from the great circle 211b, and the second small circle 211d is spaced apart in parallel in a second direction 2002 that is opposite to the first direction 2001 from the great circle 211b. The second device 220 may include various electronic components (e.g., the camera 222, a display, a microphone, a speaker, a sensor or a battery) at least partially arranged in a space between the inner circumference surface 221a and the outer circumference surface 221b.

The second device 220 may take a rotation motion 201 centering on an axis (C1) passing the center of the great circle 211b which the inner circumference surface 221a follows. The second device 220 may take a tilting motion 202. In response to the second device 220 taking the tilting motion 202, a region of the spherical surface 211a facing the inner circumference surface 221a is changed and, accordingly, the great circle 211b, the first small circle 211c, the second small circle 211d and the axis (C1) may also be varied. The tilting motion 202 may be denoted as a rotation motion centering on an axis orthogonal to the axis (C1) of the rotation motion 201 as well.

The driving device of the first device 210 may include a second driving device for triggering a motion (e.g., the rotation motion 201 or tilting motion 202) of the second device 220. Between the second driving device and the second device 220, a force (e.g., an attractive force) attracting each other with the first housing 211 interposed therebetween or a force (e.g., a repulsive force) pushing each other may act. For example, the second device 220 may include a plurality of second magnets arranged in the inner circumference surface 221a, and the second driving device may include a plurality of first magnets which are aligned with the plurality of second magnets. In response to the second driving device taking a rotation motion or a tilting motion, the second device 220 may also take the rotation motion 201 or the tilting motion 202, due to the attractive force or the repulsive force between the plurality of first magnets and the plurality of second magnets.

The second device 220 is not limited to the form shown, but may be formed in various other forms of being movable on the first housing 211 as well.

The first device 210 may control the second driving device based on instructions or a program 140 stored in a memory 130 included in the first device 210 or the second device 220. For example, the first device 210 may control the second driving device based on a signal (or input) received from the electronic device 102, the electronic device 104, or the server 108, or data acquired from at least one sensor (e.g., an acceleration, gyro or geomagnetic related sensor) arranged in at least one of the first device 210 or the second device 220. Thus, a rotation direction, a rotation angle, a rotation amount, a rotation speed, a rotational acceleration or a rotating angular speed for the rotation motion 201 or tilting motion 202 of the second device 220 may be identified.

The first device 210 may receive a signal from the second device 220 or transmit a signal to the second device 220 through wireless communication. For example, the first device 210 may communicate with the second device 220 through a short-range communication network (e.g., the first network 198) such as Bluetooth, WiFi direct, or a standard of the IrDA. The first device 210 or the second device 220 may wirelessly communicate with an external control unit (e.g., a data logging or navigation system).

The electronic device 200 may be implemented as autonomous robots or remotely controlled (e.g., teleoperated) robots.

Figure 3:
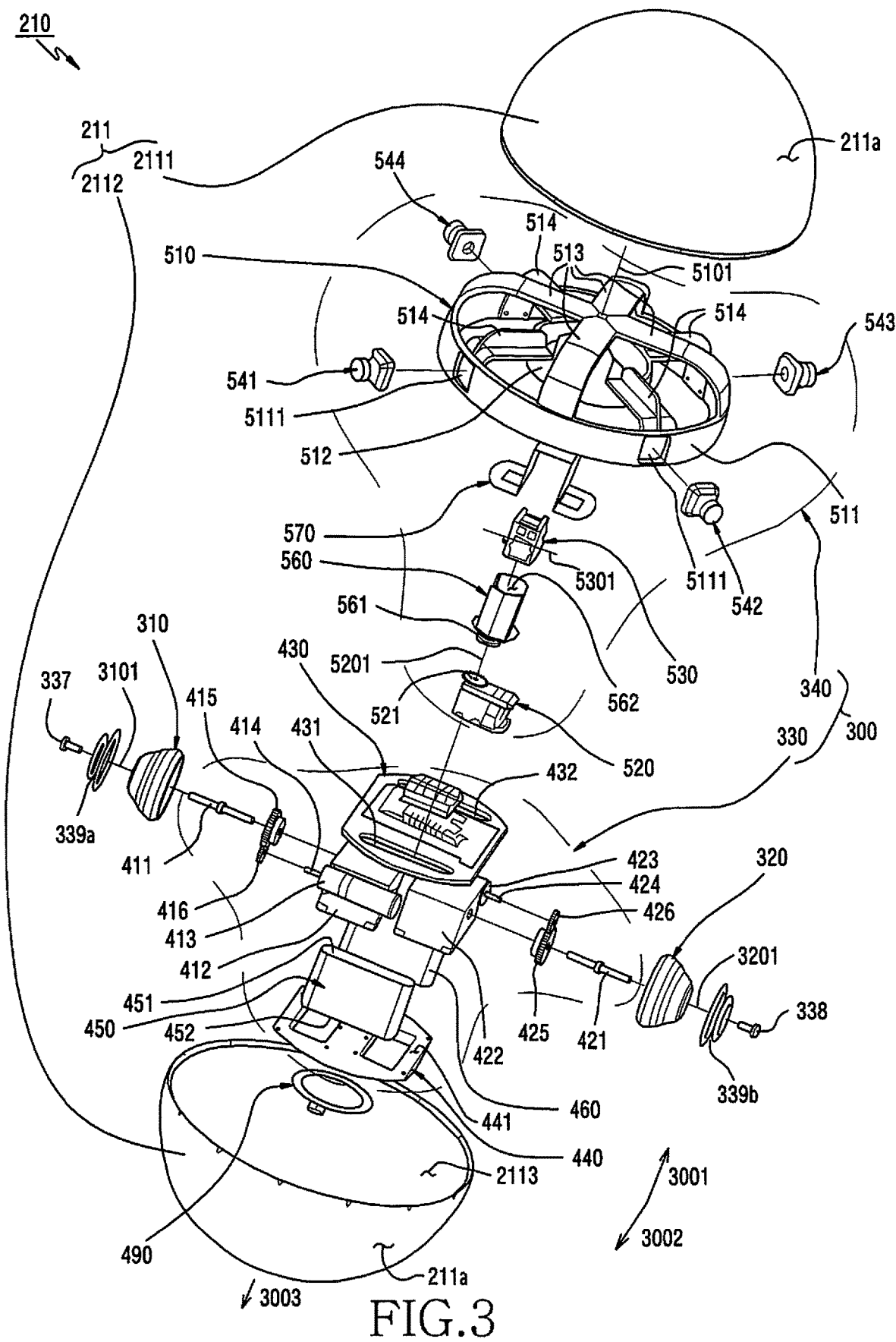
FIG. 3 is an exploded perspective view of a first device of FIG. 2A according to an embodiment.
Figure 4:
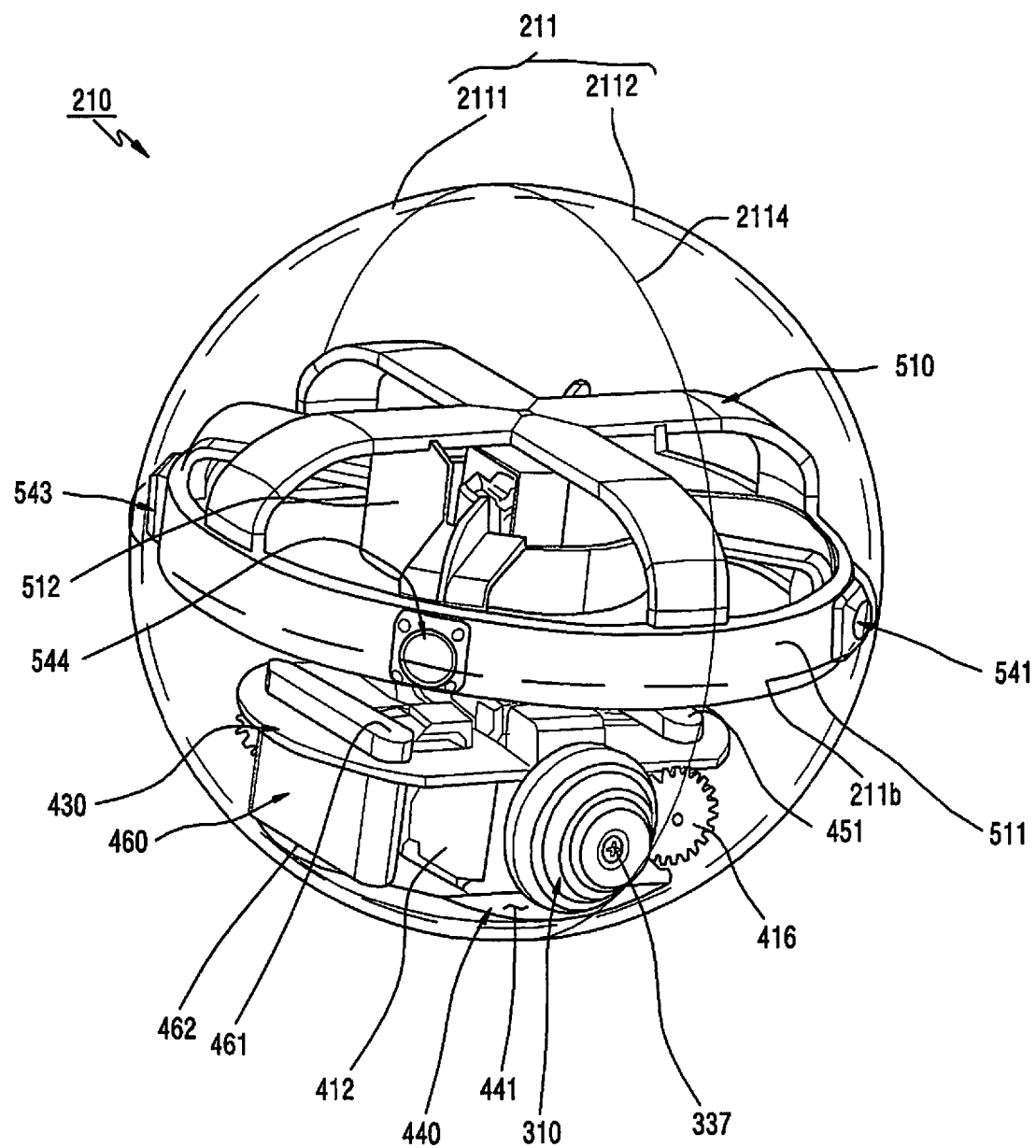
FIG. 4 is a perspective view of a first device according to an embodiment.
Figure 5:
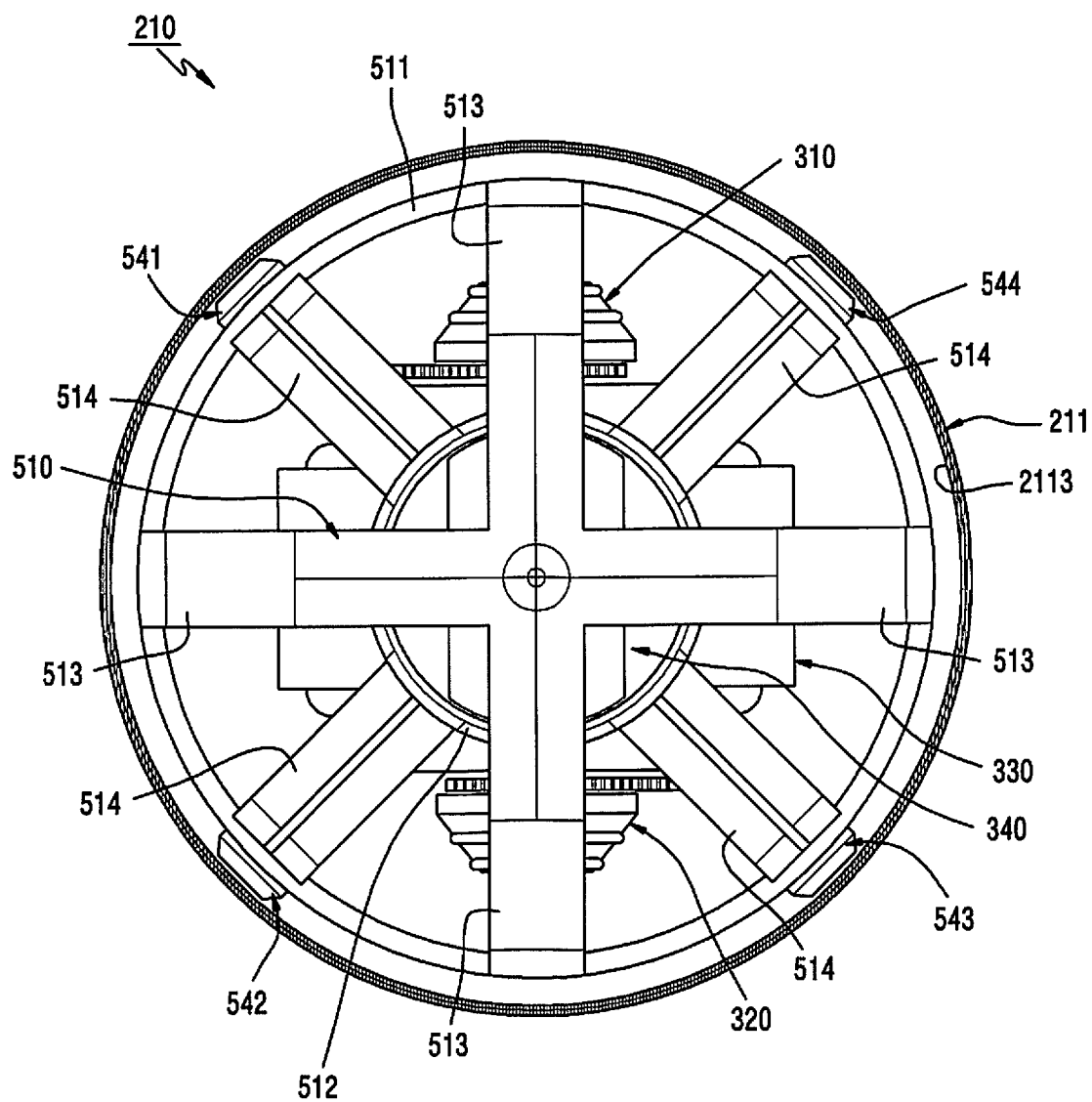
FIG. 5 is a partial cross section of a first device according to an embodiment.

FIG. 3 is an exploded perspective view of the first device 210 of FIG. 2A according to an embodiment. FIG. 4 is a perspective view of the first device 210 according to an embodiment. FIG. 5 is a partial cross section of the first device 210 according to an embodiment.

Referring to FIGS. 3, 4 and 5, the first device 210 may include at least one of the first housing 211, a first wheel 310, a second wheel 320 or a driving device 300 (e.g., a first driving device 330 and a second driving device 340).

The first housing 211 may include a first semispherical housing 2111 and a second semispherical housing 2112. The first wheel 310, the second wheel 320 and the driving device 300 may be arranged in a spherical internal space provided by the coupling of the first semispherical housing 2111 and the second semispherical housing 2112. In FIG. 4, the first housing 211 has been transparently expressed for the sake of structural understanding of elements arranged in the first housing 211, but according to various embodiments, the first housing 211 may be formed of opaque or transparent materials. At least a part of the first housing 211 may be formed of solid material or flexible material (or elastic material). For example, the first housing 211 may include an external structure forming an outer spherical surface 211a having elasticity, and an internal structure forming a rigid inner surface 2113.

The first housing 211 may fully seal the first device 210 from the external environment. For example, sealing material may be interposed at a junction part 2114 between the first semispherical housing 2111 and the second semispherical housing 2112.

The driving device 300 may include a first driving device 330 for delivering power to the first wheel 310 and the second wheel 320. The first wheel 310 and the second wheel 320 may be coupled to both sides of the first driving device 330 and be rotated by receiving power from the first driving device 330. The first driving device 330 may be denoted as an element including a wheel (e.g., the first wheel 310 or the second wheel 320).

The first driving device 330 may include elements for delivering power to the first wheel 310 and, for example, may include at least one of a first shaft 411, a first support member 412, a first motor 413, a first gear 415 or a second gear 416. The first shaft 411 may connect the first wheel 310 and the first support member 412. The one end part of the first shaft 411 may be coupled with the first wheel 310 by a bolt 337, and the other end part of the first shaft 331 may be rotatably coupled with a hole provided in the first support member 412. The first gear 415 may be connected with the first shaft 411 between the first wheel 310 and the first support member 412. The first motor 413 may be arranged in the first support member 412, and a shaft 414 of the first motor 413 may be connected with the second gear 416. The first gear 415 and the second gear 416 may deliver rotation or power between the first shaft 411 and the shaft 414 of the first motor 413. For example, the first gear 415 and the second gear 416 may be spur gears or helical gears. In response to the first motor 413 being driven, the first wheel 310 may be rotated by interaction between the second gear 416 connected with the shaft 414 of the first motor 413 and the first gear 415 connected with the first shaft 411. The first gear 415 may have many more number of teeth than the second gear 416, and a gear ratio of the first gear 415 and the second gear 416 may be variously prepared. Various other gears (e.g., bevel gears and skew gears) delivering power between the first wheel 310 and the first motor 413 may be used instead. Accordingly, the arrangement of the first shaft 411 and/or the first motor 413 may be varied. The shaft 414 of the first motor 413 and the first wheel 310 may be directly connected as well, without the first gear 415 and the second gear 416.

The first driving device 330 may include elements for delivering power to the second wheel 320, and may be prepared substantially identically with elements for delivering power to the first wheel 320. For example, the first driving device 330 may include at least one of the second shaft 421, the second support member 422, the second motor 423, the third gear 425 or the fourth gear 426, in association with the second wheel 320. The one end part of the second shaft 421 may be coupled with the first wheel 320 by a bolt 338, and the other end part of the second shaft 421 may be rotatably coupled with a hole provided in the first support member 422. The third gear 425 may be connected with the second shaft 421 between the second wheel 320 and the second support member 422. The second motor 423 may be arranged in the second support member 422, and the shaft 424 of the second motor 423 may be connected with the fourth gear 426. The third gear 425 and the fourth gear 426 may deliver power between the second motor 423 and the second wheel 320. A rotation axis 3201 of the second wheel 320 and a rotation axis 3101 of the first wheel 310 may be consistent with each other.

The first support member 412 and the second support member 422 may be formed integrally, and may include the same materials.

The first wheel 310 and the second wheel 320 may include elastic members (or flexible members) 339a and 339b such as rubber arranged in surfaces thereof. The elastic members 339a and 339b may enhance a frictional force between the inner surface 2113 of the first housing 211, and may decrease a loss of power delivered from the first wheel 310 and the second wheel 320 to the first housing 211.

The first driving device 330 may include a printed circuit board 430 and a first plate 440 which are arranged in parallel in a first direction 3001 orthogonal with the rotation axis 3101 of the first wheel 310 (or the rotation axis 3201 of the second wheel 320). A plate for supporting the printed circuit board 430 may be prepared as well.

The first support member 412 and the second support member 422 may be arranged between the printed circuit board 430 and the first plate 440. The first support member 412 and the second support member 422 may be coupled with the printed circuit board 430 and/or the first plate 440 by using an element such as a bolt.

The first driving device 330 may include a second plate 450 and a third plate 460 which are arranged in parallel in a second direction 3002 that is orthogonal with the rotation axis 3101 of the first wheel 310 (or the rotation axis 3201 of the second wheel 320) and the first direction 3001. The first support member 412 and the second support member 422 may be arranged between the second plate 450 and the third plate 460. The one end part 451 of the second plate 450 may be coupled with the printed circuit board 430, and the other end part 452 of the second plate 450 may be coupled with the first plate 440. The one end part 461 of the third plate 460 may be coupled with the printed circuit board 430, and the other end part 462 of the third plate 460 may be coupled with the first plate 440.

The printed circuit board 430 may include a first through-hole part 431 and a second through-hole part 432. The one end part 451 of the second plate 450 may be inserted into the first through-hole part 431, and the one end part 461 of the third plate 460 may be inserted into the second through-hole part 432. The first plate 440 may include one surface 441 going in the first direction 3001, and the other end part 452 of the second plate 450 and/or the other end part 462 of the third plate 460 may be coupled to face the one surface 441 by using an element such as a bolt.

The first plate 440 and the second plate 450 (or the third plate 460) may be formed integrally, and may include the same material.

At least a part of the first plate 440, the second plate 450, the third plate 460, the first support member 412 or the second support member 422 may be formed of metal materials or non-metal materials.

A processor (e.g., the processor 120 of FIG. 1), a memory, and/or an interface may be mounted on the printed circuit board 430. The processor may include, for example, one or more of a central processing device (CPU), an AP, a graphic processing device, an ISP, a sensor hub processor, or a CP.

The memory 130 may include, for example, a volatile memory 132 or non-volatile memory 134.

The interface 177 may include, for example, an HDMI, a USB interface, an SD card interface, and/or an audio interface. The interface may, for example, electrically or physically connect the electronic device 300 with an external electronic device. The interface may include a USB connector, an SD card/multimedia card (MMC) connector, or an audio connector.

At least one motor driving circuit (e.g., a motor driver or a motor controller) may be arranged in the printed circuit board 430. The at least one motor driving circuit may be electrically connected with the first motor 413 and the second motor 423, and may output a corresponding signal to the first motor 413 or the second motor 423 according to the control of the processor 120. The processor may control the first motor 413 or the second motor 423 based on instructions or a program 140 stored in a memory 130 included in the first device 210 or the second device 220. For example, the processor may control the first motor 413 or the second motor 423 based on a signal (or input) received from the electronic device 102, the electronic device 104, or the server 108, or data acquired from at least one sensor (e.g., an acceleration, gyro or geomagnetic related sensor) arranged in at least one of the first device 210 or the second device 220. Thus, a rotation direction, a rotation angle, a rotation amount, a rotation speed, a rotational acceleration or a rotating angular speed for the rotation of the first wheel 310 or the second wheel 320 may be adjusted.

The first driving device 330 may include a battery as a device for supplying power to at least one element of the first device 210. The battery may include, for example, a rechargeable secondary cell or fuel cell. The battery may be arranged between the printed circuit board 430 and the first plate 440. The battery may be arranged in various other positions. The battery may be implemented as solar cells as well.

The driving device 300 may include the second driving device 340 connected with the first driving device 330. The second driving device 340 may include, for example, at least one of a ring structure 510, a third motor 520, a fourth motor 530, a first support structure 560, a second support structure 570, or a plurality of first magnets 541, 542, 543 and 544.

The ring structure 510 may include a bracket 512, a ring shape plate (below, a ring plate) 511 surrounding the bracket 512, and a plurality of ribs 513 and 514 between the bracket 512 and the ring plate 511. The bracket 512 may be an axis for receiving power. The ring plate 511 may be arranged to face the inner surface 2113 of the first housing 211, and may be connected with the bracket 512 by the plurality of ribs 513 and 514, to take a rotation motion or tilting motion by a movement of the bracket 512. For example, the ring structure 510 may be rotated centering on a third rotation axis 5101 passing the bracket 512. The gravity center of the ring structure 510 may be formed on the third rotation axis 5101. The plurality of ribs 513 and 514 may include the first ribs 513 and the second ribs 514 which are arranged at the substantially same angle centering on the bracket 512. When viewed in the first direction 3001, the second ribs 514 may be arranged between the first ribs 513. The bracket 512 is a form including an opening, and may include a first edge and a second edge which are formed at mutually different heights in the first direction 3001. The first ribs 513 may be a form of extending from the ring plate 511 and gathering to the third rotation axis 5101. The first edge of the bracket 512 may more extend in the first direction 3001 than the second edge, to be connected with the first ribs 513. The second ribs 514 may be extended from the ring plate 511 to the second edge of the bracket 512.

The ring plate 511 may be arranged along the great circle 211b (e.g., the circumference formed by the meeting between the plane passing the center of the sphere and the spherical surface 211a) of the first housing 511.

The third motor 520 may be arranged between the bracket 512 of the ring structure 510 and the printed circuit board 530. For example, the third motor 520 may be installed in the printed circuit board 530. Various structures for coupling the third motor 520 and the printed circuit board 530 may be prepared.

The fourth motor 530 may be arranged between the bracket 512 of the ring structure 510 and the third motor 520. The first support structure 560 may be arranged between the third motor 520 and the fourth motor 530, to connect the third motor 520 and the fourth motor 530. For example, the first support structure 560 may include the one end pat 561 connected with the shaft 521 (or a gear connected with the shaft) of the third motor 520, and a space 562 capable of fitting the fourth motor 530. In response to the third motor 520 (e.g., pan motor) being driven, the first support structure 560 connected with the shaft 521 and the fourth motor 530 arranged in the first support structure 560 may take a rotation motion centering on a first rotation axis 5201 going in the first direction 3001.

The second support structure 570 may connect the bracket 512 of the ring structure 510 and the fourth motor 530. In response to the third motor 520 being driven, the first support structure 560 connected with the shaft 521 of the third motor 520, the fourth motor 520 coupled with the first support structure 560, the second support structure 570 connected with the fourth motor 520, and the ring structure 510 connected with the second support structure 570 may take a rotation motion centering on the first rotation axis 5201. In response to the fourth motor 530 (e.g., tilt motor) being driven, the second support structure 570 connected with a shaft of the fourth motor 530 and the ring structure 510 connected with the second support structure 570 may take a rotation motion (e.g., a tilting motion) centering on a second rotation axis 5301 going in a direction orthogonal with the first direction 3001.

When the first rotation axis 5201 and the third rotation axis 5301 are matched with each other, the ring structure 510 may be denoted to be in a horizontal state with respect to the first driving device. When the first rotation axis 5201 and the third rotation axis 5301 are matched with each other, in response to the third motor 530 being driven, the ring structure 510 may take a rotation motion centering on the first rotation axis 5201 or the third rotation axis 5301, in a horizontal state. When the first rotation axis 5201 and the third rotation axis 5301 are not matched by the driving of the fourth motor 530, in response to the third motor 530 being driven, the ring structure 510 may take a rotation motion centering on the first rotation axis 5201, in a non-horizontal state.

At least one motor driving circuit (e.g., a motor driver or motor controller) arranged in the printed circuit board 430 may be electrically connected with the third motor 520 and the fourth motor 530. The at least one motor driving circuit may output a corresponding signal to the third motor 520 and the fourth motor 530 according to the control of a processor 120. The processor may control the third motor 520 or the fourth motor 530 based on instructions or a program 140 stored in a memory 130 included in the first device 210 or the second device 220. For example, the processor may control the third motor 520 or the fourth motor 530 of the second driving device 340 based on a signal (or input) received from the electronic device 102, the electronic device 104, or the server 108 or the second device 220, or data acquired from at least one sensor (e.g., an acceleration, gyro or geomagnetic related sensor) arranged in at least one of the first device 210 or the second device 220.

The first device 210 may include one or more sensors. The one or more sensors may measure a posture value of the ring structure 510. The posture value may include a value of at least one of roll, pitch and yaw of the ring structure 510. For example, the ring structure 510 may move with respect to the first driving device 330 by the driving of the third motor 520 and/or the fourth motor 530, and the one or more sensors may measure a posture value of this movement. The one or more sensors are acceleration, gyro or geomagnetic related sensors, and may include, for example, a 9-axis sensor.

The one or more sensors may include an acceleration sensor capable of measuring a variation of force of the acceleration of gravity acting on an x axis, a y axis, and a z axis (e.g., an axis extending in the first direction 3001). The acceleration sensor may measure a slope with respect to the gravity acceleration. For example, when the third rotation axis 5101 of the ring structure 510 is matched with the first rotation axis 5201, in response to a value of the acceleration of gravity acting on the x axis and the y axis being equal to 0, and a value of the acceleration of gravity acting on the z axis being equal to 1G, the ring structure 510 (or ring plate 511) may be in a posture of a horizontal state. For example, in response to the ring structure 510 being rotated with a criterion of the y axis, there may be a variation of the force of the acceleration of gravity acting on the x axis and the z axis, and the ring structure 510 may be in a non-horizontal state. For example, in response to the ring structure 510 being rotated with a criterion of the x axis, there may be a variation of the force of the acceleration of gravity acting on the y axis and the z axis, and the ring structure 510 may be in a non-horizontal state.

The one or more sensors may include a gyro sensor capable of measuring an angular speed (a variation amount of angle per hour) of the ring structure 510 with respect to the x axis, the y axis, and the z axis (e.g., the axis extending in the first direction 3001).

The one or more sensors may include a geomagnetic sensor capable of obtaining a direction or rotation of the ring structure 510 by using the magnetic field of earth.

A plurality of first magnets 541, 542, 543 and 544 may be arranged in the ring plate 511 of the ring structure 510. For example, the plurality of first magnets 541, 542, 543 and 544 may be arranged in a plurality of recesses 5111 (or through-holes) provided in the ring plate 511. The plurality of first magnets 541, 542, 543 and 544 may provide a force (attractive force) attracting the second device (e.g., the second device 220 of FIG. 2A) coupled with the first device 210 or a force (repulsive force) pushing out. For example, the second device may include a plurality of second magnets aligned with the plurality of first magnets 541, 542, 543 and 544. By this, the attractive force or repulsive force may act between the ring plate 511 and the second device with the first housing 211 interposed therebetween. In response to the second driving device 340 taking a rotation motion by the third motor 520 or taking a tilting motion by the fourth motor 530, the second device may also take a rotation motion 201 or a tilting motion 202, due to the attractive force or repulsive force between the plurality of first magnets 541, 542, 543 and 544 and the plurality of second magnets.

The plurality of first magnets 541, 542, 543 and 544 may be arranged on the ring plate 511 along a circumference thereof at a predetermined interval. A posture value of the ring structure 510 measured from one or more sensors may be denoted as a posture value of the second device 220 that moves together with the ring structure 510.

According to an embodiment, the first device 210 may include at least one antenna. The at least one antenna may transmit a signal or power to the electronic device 102, the electronic device 104 or receive a signal or power from the electronic device 102, the electronic device 104. The first device 210 may transmit or receive a signal or power with the second device 220 coupled with the first device 210 through the at least one antenna. The at least one antenna may be formed as a conductor or a conductive pattern. The at least one antenna may be utilized for a short-range wireless communication network (e.g., the first network 198) or a long-range wireless communication network (e.g., the second network 199).

The first device 210 may include a balance weight. The balance weight may place too much emphasis on a gravity center of the first device 210 in a third direction 3003 that is opposite to the first direction 3001. For example, the gravity center of the first device 210 may be formed in a position which is spaced apart from the rotation axis 3101 or 3201 of a wheel to the third direction 3003. The balance weight may balance the first device 210 wherein a rear surface (e.g., a surface facing the inner surface 2113 of the first housing 211) of the first plate 440 substantially goes in the third direction 3003. The balance weight may be formed by at least a part of the first support member 412 included in the first driving device 330, the second support member 422, the first plate 440, the second plate 450, the third plate 460 or the battery. The second driving device 340 may be formed to have a set weight or less in comparison with the first driving device 330 and, thus, the gravity center of the first device 210 may place too much emphasis on the third direction 3003. The second driving device 340 may be formed to have a set height or less and, thus, the gravity center of the first device 210 may place too much emphasis on the third direction 3003. Although the first device 210 and the second device 220 are coupled, the balance weight may balance the first device 210 wherein the rear surface of the first plate 440 substantially goes in the third direction 3003.

The balance weight may solve the unbalance of the first driving device 330, which may be brought about when the first driving device 330 delivers power to the first wheel 310 and/or the second wheel 320. For example, there may be an action in which the wheel (e.g., the first wheel 310 or the second wheel 320) rotates in contact with the first housing 211, and a counteraction in which the driving device 300 is affected (e.g., rotation axis shaking) by a torque of rotating power delivery elements (e.g., the first shaft 411, the second shaft 421, the first gear 415, the second gear 416, the third gear 425 and the fourth gear 426) connected with the wheel. The balance weight may weaken or offset the torque applied to the driving device 300 by the counteraction.

The balance weight may solve the unbalance of the first driving device 330, which may be brought about when the second driving device 340 makes a rotation motion or a tilting motion.

The first device 210 may include a rear surface (e.g., a surface going in the third direction 3003) of the first plate 440 of the first driving device 330, or an antenna 490 arranged between the rear surface of the first plate 440 and the first housing 211. The antenna 490 may be arranged in the first plate 330 as well. The antenna 490 is, for example, a wireless charging antenna, and may wirelessly transmit and/or receive power required for charging. The first driving device 330 in the first housing 211 may be balanced by the balance weight, and the surface on which the antenna 490 is arranged may go in the third direction 3003.

The first device 210 may be configured to, in response to a battery level reaching a set value, move to a wireless charging device based on instructions or a program 140 stored in a memory 130. For example, in response to the first device 210 moving to the wireless charging device, the antenna 490 may be aligned with an antenna included in the wireless charging device, and power may be wirelessly transmitted from the wireless charging device to the first device 210 by electromagnetic induction between the two antennas.

The rear surface (e.g., the surface going in the third direction 3003) of the first plate 440 may include a curved surface which follows the inner surface 2113 of the first housing 211. In response to the first driving device 330 being balanced by the balance weight, the rear surface of the first plate 440 may be spaced apart from the inner surface 2113 of the first housing 211, due to the first wheel 310 and the second wheel 320 being in contact with the inner surface 2113 of the first housing 211.

Figure 6:
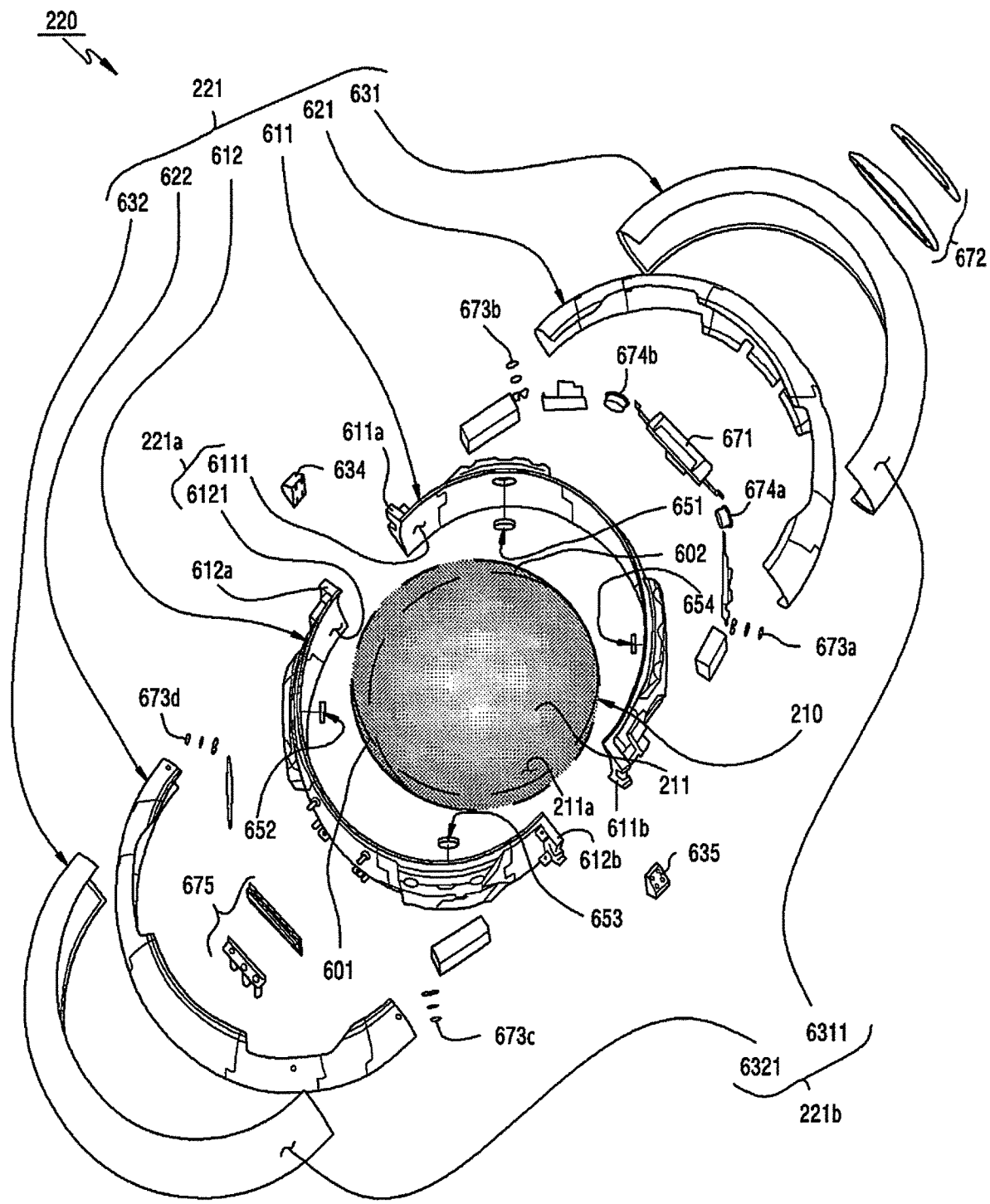
FIG. 6 is an exploded perspective view of a second device according to an embodiment.

FIG. 6 is an exploded perspective view of the second device 210 according to an embodiment.

Referring to FIG. 6, the second device 220 may include the second housing 221 of a ring shape. For example, the second housing 221 may include an inner circumference surface 221a and an outer circumference surface 221b which are arranged along a first great circle 601 (or great circle 211b) of the spherical surface 211a of the first device 210. In response to the second device 220 being coupled with the first device 210, the inner circumference surface 221a may not exposed to externally by facing the spherical surface 211a of the first device 210, and the outer circumference surface 221b may be exposed externally to form a part of an appearance. The second housing 221 may include at least one of a first plate 611, a second plate 612, a first inner cover 621, a second inner cover 622, a first outer cover 631 or a second outer cover 632.

The first plate 611 may have a curved shape which is extended along one side (e.g., a semicircle) of the first great circle 601 of the spherical surface 211a. The first plate 611 may have a curved shape which is extended from the first great circle 601 along a part of the second great circle 602 being orthogonal with the first great circle 601. The first plate 611 may form one side 6111 of the inner circumference surface 221a of the second housing 221. The second plate 612 may be arranged opposite the first plate 611 and be coupled with the first plate 611, and may be a form at least similar with the first plate 611. The second plate 612 may form the other side 6121 of the inner circumference surface 221a of the second housing 221. The one end part 611a of the first plate 611 and the one end part 612a of the second plate 612 may be coupled with each other by a first member 634, and the other end part 611b of the first plate 611 and the other end part 612b of the second plate 612 may be coupled with each other by a second member 635.

The first inner cover 621 may be extended along one side (e.g., a semicircle) of the first great circle 601 of the spherical surface 211a and be coupled with the first plate 611. The second inner cover 622 may be extended along the other side (semicircle) of the first great circle 601 of the spherical surface 211a and be coupled with the second plate 612.

The first outer cover 631 may be extended along one side (e.g., a semicircle) of the first great circle 601 of the spherical surface 211a. The first outer cover 631 may form one side 6311 of the outer circumference surface 221b of the second housing 221. The second outer cover 632 may be extended along the other side (e.g., a semicircle) of the first great circle 601 of the spherical surface 211a. The second outer cover 632 may form the other side 6321 of the outer circumference surface 221b of the second housing 221. The first outer cover 631 and the first inner cover 621, or the second outer cover 632 and the second inner cover 622 may be formed integrally, and may include the same materials.

The second device 220 may be formed to have a structure that is mountable on the first housing 211 of the first device 210 in an assembled state. For example, the first plate 611 may include a first portion which is arranged at an up side centering on the first great circle 601 and a second portion which is arranged at a down side. The second plate 612 may also include a first portion which is arranged at an up side centering on the first great circle 601, and a second portion which is arranged at a down side. The first portions may have a curved shape which is extended along a part of the second great circle 602 being orthogonal with the first great circle 601. The second portions may be extended from the first portions at a distance from the spherical surface 211a, and may make it possible to mount the second device 220 of the assembled state on the first housing 211. In response to the second device 220 of the assembled state being mounted on the first housing 211, the first portions may face the spherical surface 211a while supporting the mounting thereof. In this case, the first plate 611 and the second plate 612 may be formed integrally without the first member 634 and the second member 635. A circumference of the first portion of the first plate 611 or the second plate 612 arranged adjacent to the first small circle 211c of the first device 210 may be less than the first great circle 601. A circumference of the second portion of the first plate 611 or second plate 612 arranged adjacent to the second small circle 211d of the first device 210 may be greater than the first great circle 601.

The second device 220 may include various electronic components (e.g., a camera 671, a display 672, a plurality of microphones 673a, 673b, 673c and 673d, a plurality of speakers 674a and 674b, a wireless and/or wired charging module 675, at least one sensor or a battery) at least partially arranged between the outer circumference surface 221b and the inner circumference surface 221a, between the first plate 611 and the first inner cover 621, or between the second plate 612 and the second inner cover 622. The types of the electronic components, the positions of the electronic components or the number of the electronic components are not limited to the example illustrated in FIG. 6 but may be formed differently.

At least one electronic component may be arranged in the first plate 611 or the second plate 612. For example, a printed circuit board (e.g., a rigid printed circuit board) or a flexible printed circuit board for a wire between the electronic components or the mounting of the electronic components may be arranged in the first plate 611 or the second plate 612.

At least one electronic component may be arranged in the first inner cover 621 or the second inner cover 622. For example, the camera 671 may be arranged in an opening provided in the first inner cover 621, or may be arranged in one surface of the first inner cover 621 facing the first outer cover 631.

At least one electronic component may be arranged in the first outer cover 631 or the second outer cover 632. For example, the display 672 (or a light emitting element (e.g., a light emitting diode (LED))) may be arranged in the first outer cover 631 and exposed through the outer circumference surface 6311 of the first outer cover 631.

The second device 220 may include a plurality of second magnets 651, 652, 653 and 654 which are arranged in the inner circumference surface 221*a* along a circumference thereof at a predetermined interval. For example, the plurality of second magnets 651, 652, 653 and 654 may be arranged in a recess or through-hole provided in the inner circumference surface 221*a*. The plurality of second magnets 651, 652, 653 and 654 may be aligned with a plurality of first magnets 541, 542, 543 and 544 of the first device 210. Thus, a force (e.g., an attractive force) attracting each other with the first housing 211 interposed therebetween or a force (e.g., a repulsive force) pushing out each other may act between the first device 210 and the second device 220. In response to the second driving device 340 in which the plurality of first magnets are arranged making a rotation motion or a tilting motion, the second device 220 may also make the rotation motion 201 or the tilting motion 202, due to the attractive force or repulsive force between the plurality of first magnets and the plurality of second magnets 651, 652, 653 and 654.

Figure 7:
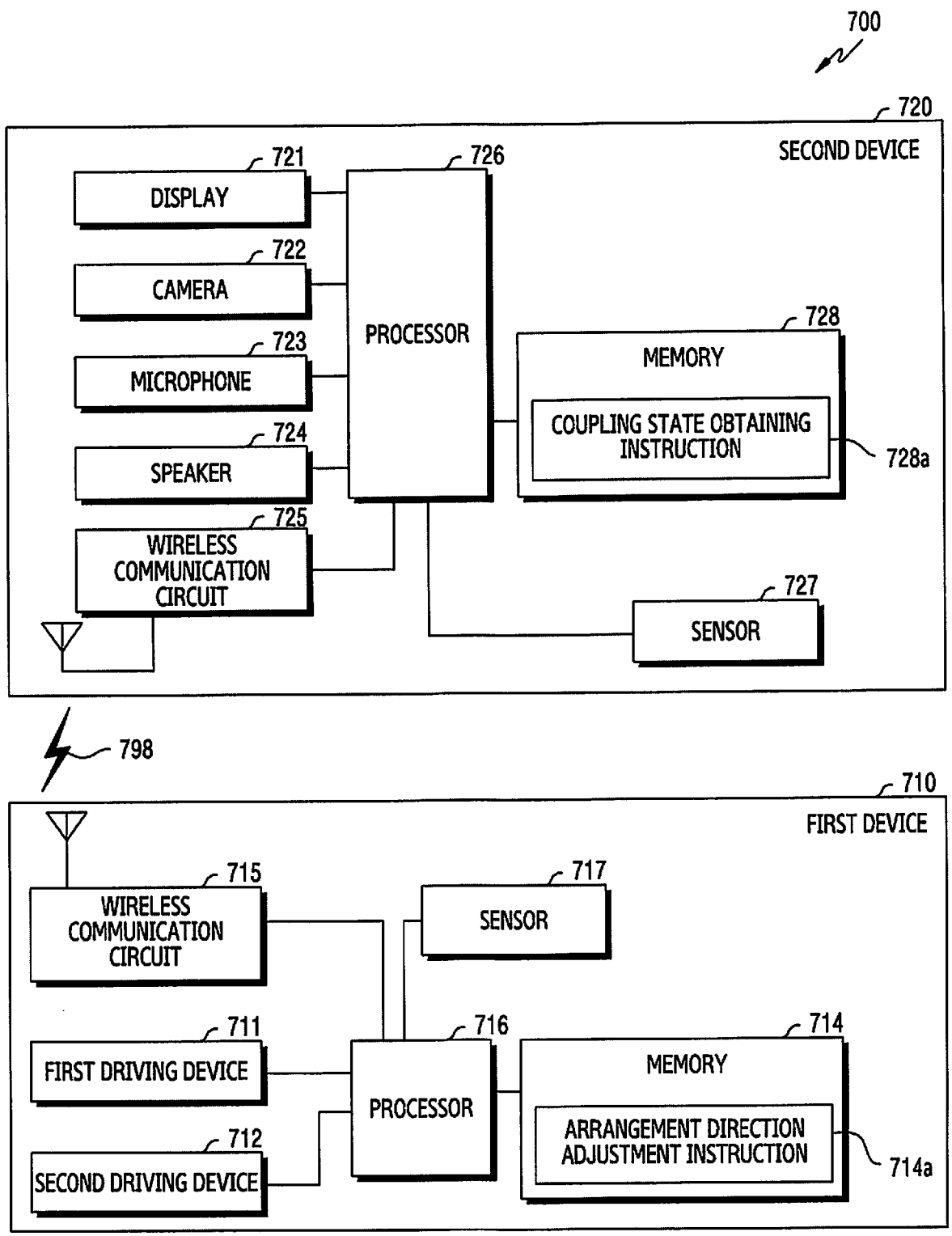
FIG. 7 is a block diagram of an electronic device according to an embodiment.

FIG. 7 is a block diagram of an electronic device 700 according to an embodiment.

Referring to FIG. 7, the electronic device 700 (e.g., the electronic device 101 or 200) may include a first device 710 and a second device 720. The first device 710 may have a spherical appearance, and may trigger a rolling motion of the first device 710 to move the electronic device 700 into position. The second device 720 may be arranged on a surface of the first device 710 and be moved on the first device 710 by the control of the electronic device 700.

The first device 710 may include at least one of a first driving device 711, a second driving device 712, a memory 714, a wireless communication circuit 715, a processor 716 or at least one sensor 717.

The first driving device 711 may be arranged in a spherical housing, to trigger a rolling motion of the first driving device 711. The first driving device 711 may include at least one wheel) being in contact with an inner surface of the spherical housing, and at least one motor for delivering power to the at least one wheel. The first driving device 711 may include a motor controller for adjusting a rotation direction, a rotation angle, a rotation amount, a rotation speed, a rotational acceleration or a rotating angular speed of at least one motor according to the control of the processor 716.

The second driving device 712 may be arranged in the spherical housing, and trigger a motion of the second device 720 arranged on the first device 710. The second driving device 712 may be connected with the first driving device 711, and may make the rotation motion or tilting motion on the first driving device 711. The second driving device 712 may include a ring structure 510 including an annular surface arranged to face an inner surface of the spherical housing, and at least one motor for a rotation motion or tilting motion of the ring structure. The second driving device 712 may include a motor controller for adjusting a rotation direction, a rotation angle, a rotation amount, a rotation speed, a rotational acceleration or a rotating angular speed of the at least one motor according to the control of the processor 716.

The second driving device 712 may include a plurality of first magnets 541, 542, 543 and 544 arranged in the ring structure 510. The second device 720 may include a plurality of second magnets 651, 652, 653 and 654 aligned with the first magnets. In response to the ring structure of the second driving device 712 taking a rotation motion or a tilting motion, the second device 720 may also make the rotation motion or the tilting motion, due to an attractive force or a repulsive force between the plurality of first magnets and the plurality of second magnets.

At least one sensor 717 may obtain various data about the second device 720 arranged on the first device 710. For example, in response to the second device 720 being arranged on the first device 710, the at least one sensor 717 (e.g., a Hall effect integrated circuit (IC)) may acquire data related with an arrangement direction of the second device 720 with respect to the first device 710. The at least one sensor 717 may measure a posture value of the second device 720 with respect to the first device 710. For example, the at least one sensor 717 may include an acceleration, gyro or geomagnetic related sensor (e.g., a 9-axis sensor).

The memory 714 may store an arrangement direction adjustment instruction 714*a*. The arrangement direction adjustment instruction 714*a* may include a routine for enabling the processor 716 to identify the coupling or non-coupling of the second device 720 with the first device 710. The arrangement direction adjustment instruction 714*a* may include a routine for enabling the processor 716 to, in response to the coupling of the second device 720 with the first device 710 being identified, convert the first device 710 from a sleep mode to a wake-up mode. The arrangement direction adjustment instruction 714*a* may include a routine for enabling the processor 716 to distinguish whether the arrangement direction adjustment of the second device 720 with respect to the first device 710 is needed. The arrangement direction adjustment instruction 714*a* may include a routine for enabling the processor 716 to, in response to identifying that an arrangement direction adjustment of the second device 720 with respect to the first device 710 is needed, control the first driving device 711 or the second driving device 712 to adjust an arrangement direction of the second device 720 with respect to the first device 710. The arrangement direction adjustment instruction 714*a* may include a routine for enabling the processor 716 to, in response to identifying that the arrangement direction adjustment of the first device 710 with respect to the second device 720 is needed, control the first driving device 711 or the second driving device 712 to adjust an arrangement direction of the first device 720 with respect to the second device 720 as well.

The arrangement direction adjustment instruction 714*a* may include a routine for enabling the processor 716 to identify the coupling or non-coupling of the second device 720 with the first device 710. The arrangement direction adjustment instruction 714*a* may include a routine for enabling the processor 716 to, in response to the coupling of the second device 720 with the first device 710 being identified, allow the first device 710 to enter the wake-up mode. The arrangement direction adjustment instruction 714a may include a routine for enabling the processor 716 to, in response to converting from the sleep mode to the wake-up mode, default set a driving device (e.g., the first driving device 711 or the second driving device 712) according to instructions stored in the memory 714. The default setting may indicate an operation or mode for correcting a posture (e.g., a direction or angle) of the second driving device 712 with respect to the first driving device 711, or a posture of the first driving device 711 with respect to the second driving device 712, into a set initial posture.

The wireless communication circuit 715 (e.g., the wireless communication module 192 of FIG. 1) may establish communication between the first device 710 and the second device 720. For example, the wireless communication circuit 715 may support a short-range communication network 798 (e.g., the first network 198) such as Bluetooth, WiFi direct or a standard of the IrDA.

The second device 720 may include at least one of a display 721, a camera 722, a microphone 723, a speaker 724, a wireless communication circuit 725, a processor 726, at least one sensor 727 or a memory 728.

The memory 728 may store a coupling state obtaining instruction 728a. The coupling state obtaining instruction 728a may include a routine for enabling the processor 716 to identify whether the second device 720 is in an abnormal coupling state with respect to the first device 710 by using the at least one sensor 727. The abnormal coupling state may indicate a state of a high possibility in which the second device 720 is separated from the first device 710. The coupling state obtaining instruction 728a may include a routine for enabling the processor 716 to, in response to identifying that the second device 720 is in the abnormal coupling state, output information on the abnormal coupling state of the second device 220 through the display 721 or the speaker 724. The coupling state obtaining instruction 728a may include a routine for enabling the processor 716 to, in response to identifying that the second device 720 is in a normal coupling state, transmit a wake-up signal through the wireless communication circuit 725.

The elements of the second device 720 may be variously provided according to a function or service of the second device 720. For example, the second device 720 may omit at least one of the elements, or add one or more other elements.

Figure 8:
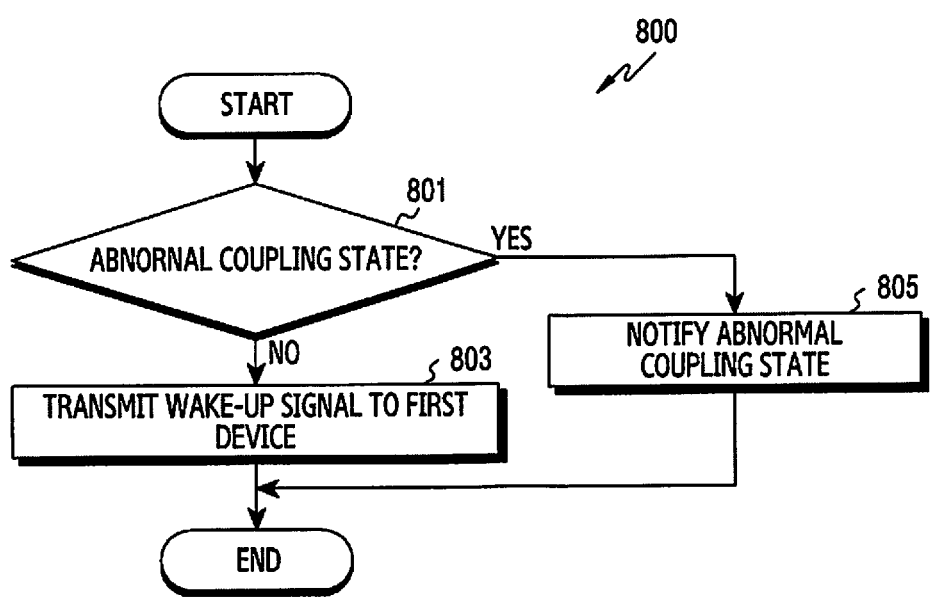
FIG. 8 is a flowchart of a method of a second device of FIG. 7 according to an embodiment.
Figure 9:
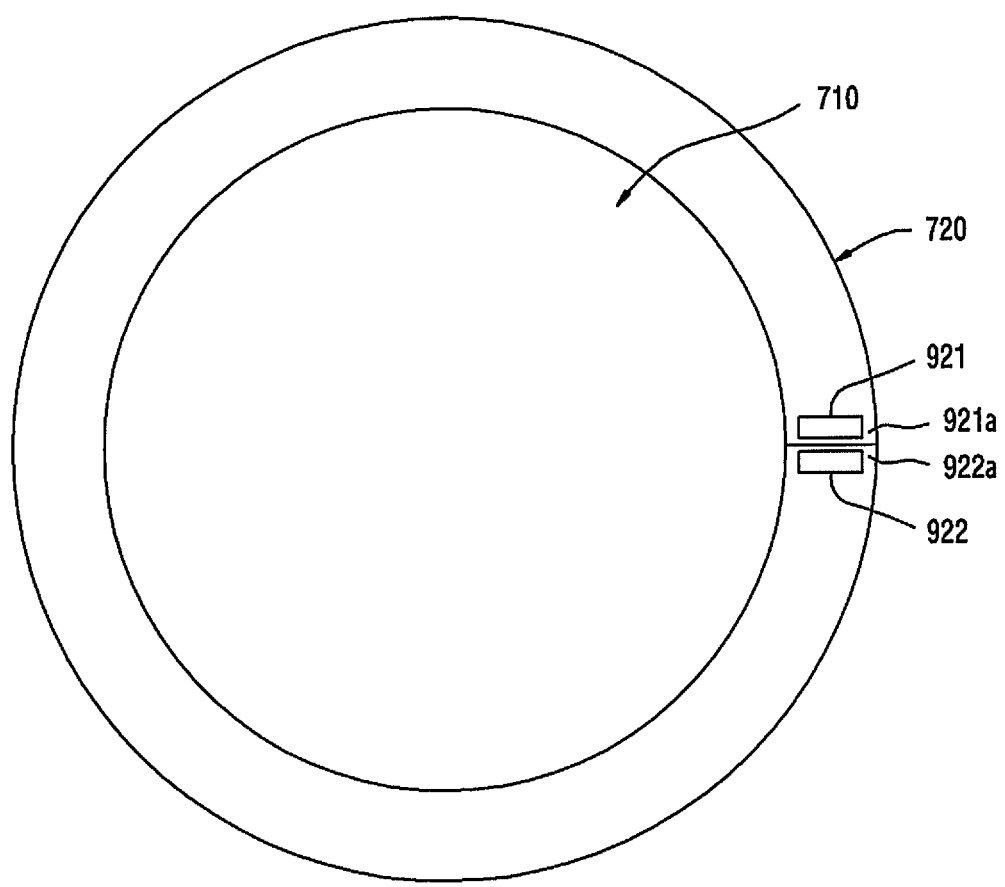
FIGS. 9, 10 and 11 are illustrations of the method of FIG. 8 according to an embodiment.
Figure 10:
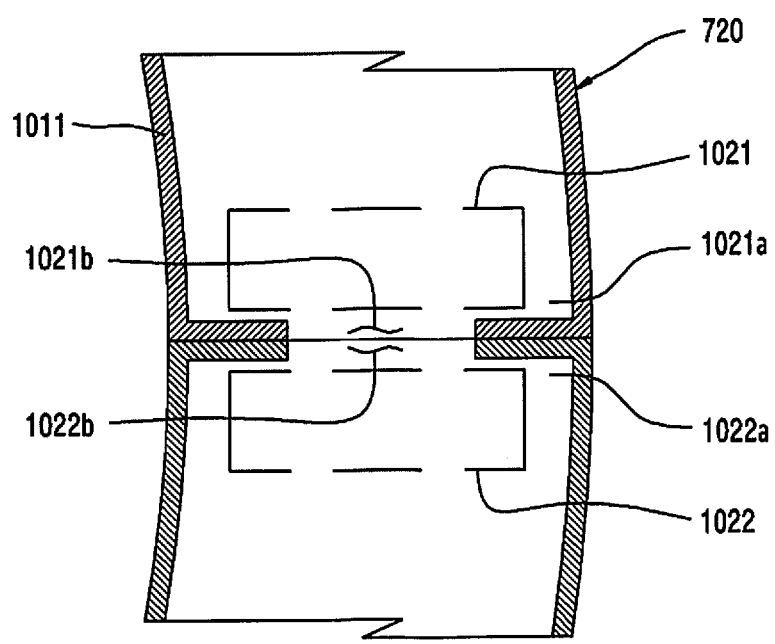
Figure 11:
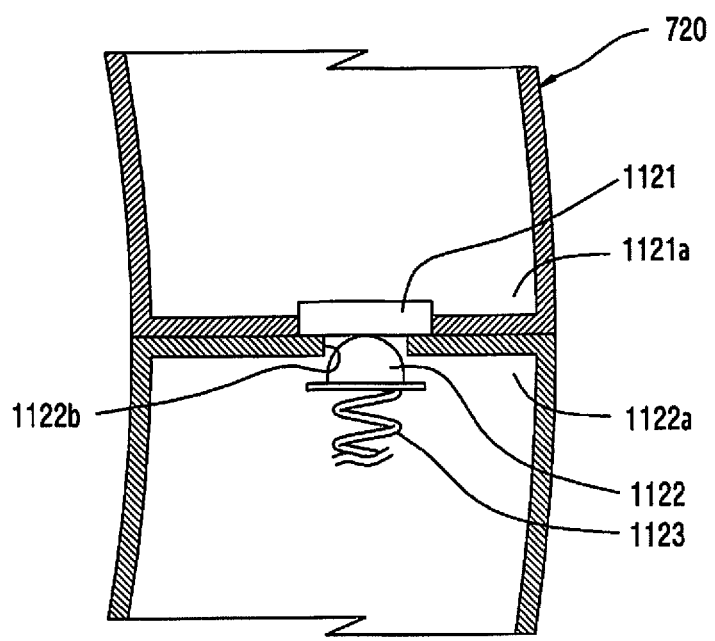

FIG. 8 is a flowchart of a method of the second device 720 of FIG. 7 according to an embodiment. FIGS. 9, 10 and 11 are illustrations of the method of FIG. 8 according to an embodiment.

Referring to FIGS. 7 and 8, according to an embodiment, in step 801, the processor 726 of the second device 720 may identify whether the second device 720 is in an abnormal coupling state. The abnormal coupling state may indicate a state of a high possibility in which the second device 720 is separated from the first device 710. For example, referring to FIG. 6, in response to the one end part 611a of the first plate 611 and the one end part 612a of the second plate 612 being coupled by the first member 634, and the other end part 611b of the first plate 611 and the other end part 612b of the second plate 612 being coupled by the second member 635, the second device 220 may be arranged on the first device 210 in a normal coupling state. In response to the one end part 611a of the first plate 611 and the one end part 612a of the second plate 612 not being normally coupled by the first member 634, or the other end part 611b of the first plate 611 and the other end part 612b of the second plate 612 not being normally coupled by the second member 635, the second device 220 may be arranged on the first device 210 in the abnormal coupling state.

For example, the processor 726 may obtain the abnormal coupling state of the second device 720 based on data acquired from the at least one sensor 727 arranged in the second device 720. Referring to FIG. 9, the second device 720 may include a sensor 921 arranged at one side part 921a, and a sensor corresponding member 922 arranged at the other side part 922a. When the second device 720 is arranged on the first device 710, in response to the one side part 921a and the other side part 922a facing and normally coupling with each other, the sensor 921 may be aligned to face the sensor corresponding member 922. In response to the sensor 921 and the sensor corresponding member 922 facing and aligning with each other, the sensor 921 may obtain data about the sensor corresponding member 922. In response to the sensor 921 obtaining the data about the sensor corresponding member 922, the processor 726 may determine that the second device 720 is in the normal coupling state.

The sensor 921 may include a Hall effect IC, and the sensor corresponding member 922 may include a magnet. In response to the one side part 921a and the other side part 922a of the second device 720 facing and coupling with each other, the Hall effect IC and the magnet may be aligned with each other, and the Hall effect IC may recognize the magnet, to output an electrical signal. The processor 726 of FIG. 7 may identify the normal coupling state of the second device 720 based on the electrical signal outputted from the Hall effect IC.

Referring to FIG. 10, a sensor 1021 may include an optical sensor capable of obtaining light, and a sensor corresponding member 1022 may include a light source (e.g., a light-emitting diode (LED)) capable of outputting light of a specified or set frequency. The one side part 1021a at which the sensor 1021 is arranged may include a through-hole 1021b arranged to face the sensor 1021. The other side part 1022a at which the sensor corresponding member 1022 is arranged may include a through-hole 1022b arranged to face the sensor corresponding member 1022. In response to the one side part 1021a and the other side part 1022a of the second device 720 facing and coupling with each other, the through-holes 1021b and 1022b are aligned with each other, and the optical sensor may obtain light of a specified frequency outputted from the light source and output an electrical signal. The processor 726 of FIG. 7 may identify the normal coupling state of the second device 720 based on the electrical signal outputted from the optical sensor. The through-hole 1021b or 1022b may be replaced with a light transmittance region formed in the second housing 1011 as well.

By using other various sensors, the processor 726 may identify the abnormal coupling state of the second device 720. For example, in response to the one side part and the other side part of the second device 720 facing and coupling with each other, a proximity sensor arranged at the one side part may output an electrical signal on the proximity of the other side part. The processor 726 of FIG. 7 may identify the normal coupling state of the second device 720 based on the electrical signal outputted from the proximity sensor.

Referring to FIG. 11, the second device 720 may include a first terminal 1121 arranged at the one side part 1121a, and a second terminal 1122 arranged at the other side part 1122a. The second terminal 1122 may be arranged in the through-hole 1122b provided in the other side part 1122a. In response to the one side part 1121a and the other side part 1122a of the second device 720 facing and coupling with each other, the second terminal 1122 may be electrically connected in physical contact with the first terminal 1121. The second terminal 1122 may make elastic contact with the first terminal 1121 by means of an elastic member such as a compression spring 1123. The processor 726 of FIG. 7 may identify the normal coupling state of the second device 720 through the conducting of the first terminal 1121 and the second terminal 1122.

Referring to FIG. 8, in response to identifying that the second device 720 is in the abnormal coupling state in step 801, in step 805, the processor 726 may notify a user of the abnormal coupling state of the second device 220. For example, the processor 726 may display an image about the abnormal coupling state through the display 721, or output a voice about the abnormal coupling state through the speaker 723. Information about the abnormal state outputted through the display 721 or the speaker 723 may prompt the user to change the second device 720 from the abnormal coupling state to the normal coupling state.

In response to identifying that the second device 720 is in the normal coupling state in step 801, in step 803, the processor 726 may transmit a wake-up signal to the first device 710. In response to the wake-up signal being received from the second device 720, the first device 710 may convert from a sleep mode to a wake-up mode. The sleep mode may indicate a state of inactivating at least one element (e.g., the first driving device 711 or the second driving device 712) of the first device 710. The wake-up mode may indicate a state of activating at least one element of the first device 710.

Figure 12:
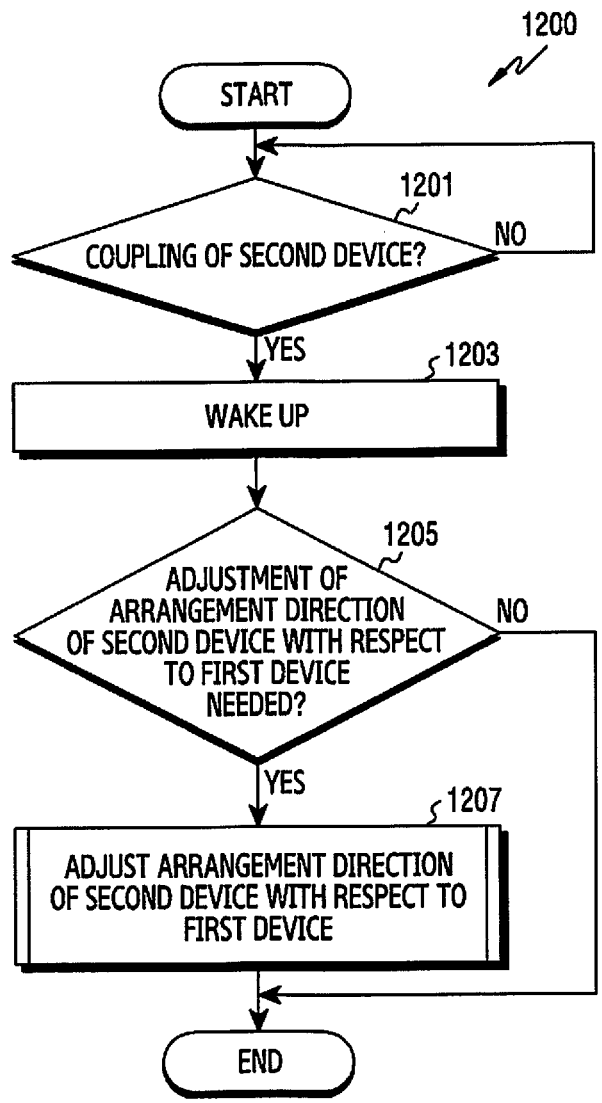
FIG. 12 a flowchart of a first device of FIG. 7 according to an embodiment.
Figure 13A:
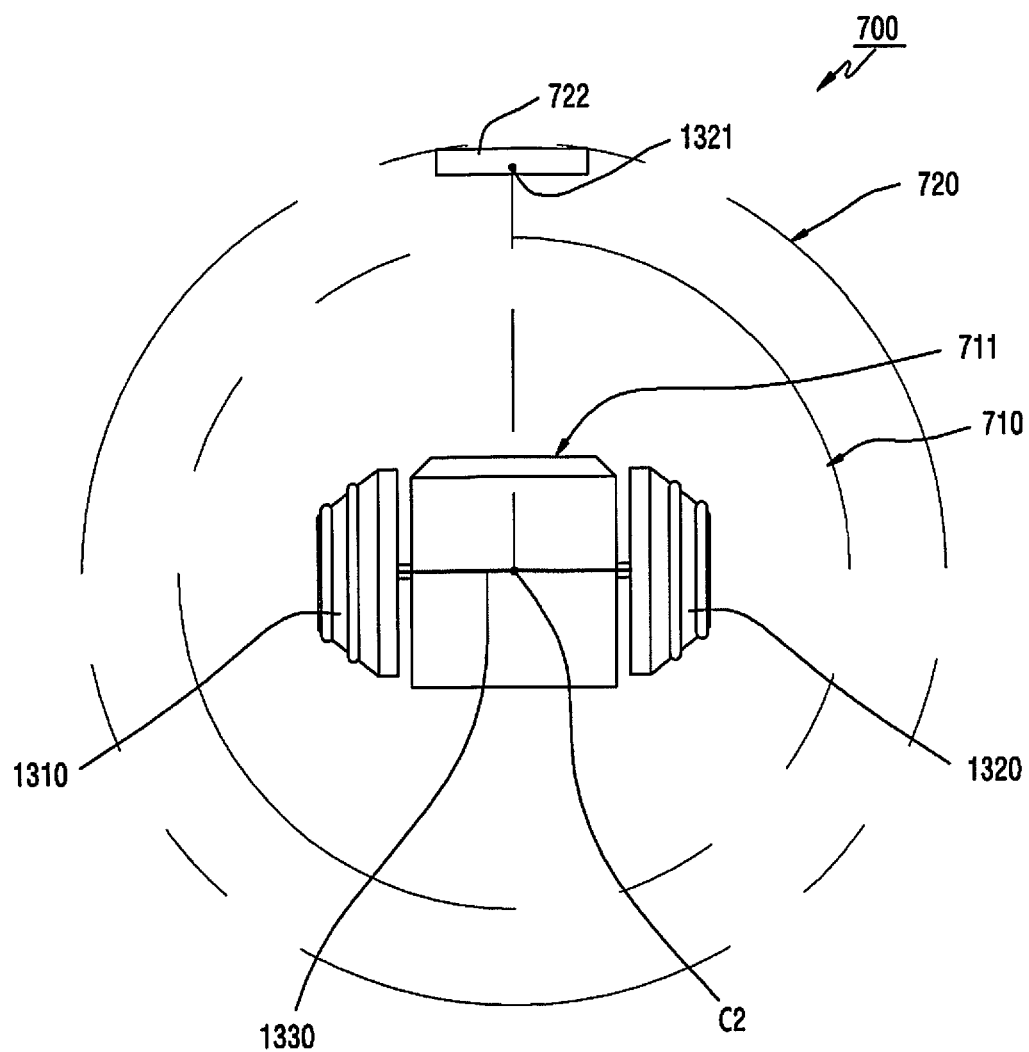
FIGS. 13A and 13B are illustrations of the method of FIG. 12 according to an embodiment.
Figure 13B:
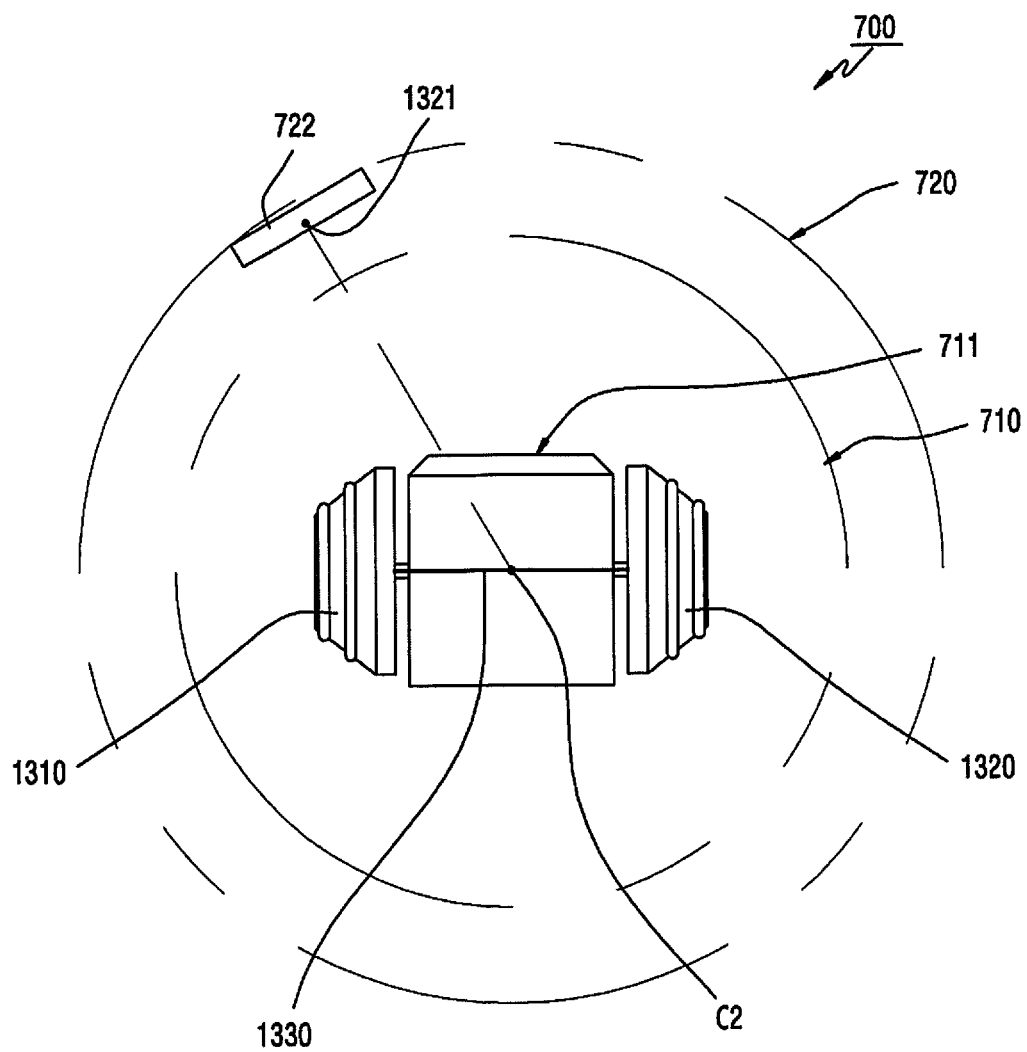

FIG. 12 is a flowchart 1200 of a method of the first device 710 of FIG. 7 according to an embodiment. FIGS. 13A and 13B are illustrations of the method of FIG. 12 according to an embodiment.

Referring to FIGS. 7 and 12, the first device 710 may include the spherical housing, and the first driving device 711 arranged in the spherical housing and triggering a rolling motion of the spherical housing. The first device 710 may include the second driving device 712 arranged in the spherical housing, and the second driving device 712 may trigger a motion (e.g., a rotation motion or tilting motion 202) of the second device 720 arranged on a surface of the first device 710.

The flowchart 1200 of FIG. 12 may be a method for initializing an arrangement direction of the second device 720 with respect to the first device 710 in response to the second device 720 being arranged on the first device 710.

In step 1201, the processor 716 of the first device 710 may identify the coupling or non-coupling of the second device 720 with respect to the first device 710. Referring to FIG. 8, the second device 720 may transmit a wake-up signal to the first device 710 based on a normal coupling state, and the processor 716 may identify the coupling of the second device 720 with the first device 710 based on the received wake up signal.

In response to the coupling of the second device 720 being identified, in step 1203, the processor 716 may wake up and activate at least some elements of the first device 710 (e.g., a wake-up mode).

In step 1205, the processor 716 may determine whether an adjustment of an arrangement direction of the second device 720 with respect to the first device 710 is needed. The arrangement direction of the second device 720 may be related with whether a set position of the second device 720 is aligned with which position on a surface of the first device 710. For example, FIGS. 13A and 13B illustrate the electronic device 700 in a planar scheme in response to the second device 720 being arranged on the first device 710.

For example, FIG. 13A illustrates a state in which the adjustment of the arrangement direction of the second device 720 with respect to the first device 710 is not needed in response to the second device 720 being arranged on the first device 710. FIG. 13B illustrates a state in which the adjustment of the arrangement direction of the second device 720 with respect to the first device 710 is needed in response to the second device 720 being arranged on the first device 710. Referring to FIG. 13A, in response to arranging the second device 720 on the first device 710, a set position 1321 of the second device 720 may be arranged in a direction substantially orthogonal with a rotation axis 1330 from the center (C2) on the rotation axis 1330 between wheels 1310 and 1320. Referring to FIG. 13B, in response to arranging the second device 720 on the first device 710, the set position 1321 of the second device 720 may be arranged in a direction not orthogonal with the rotation axis 1330 from the center (C2) on the rotation axis 1330 between the wheels 1310 and 1320. The set position 1321 may be a position in which the camera 722 is arranged. The set position 1321 may be a position in which various other elements related with directivity when the electronic device 700 performs a corresponding function are arranged. For example, in response to arranging the second device 720 on the first device 710, the first device 710 may have difficulty recognizing the arrangement direction of the second device 720, and there may be a limit of use of having to arrange the second device 720 in a direction which is set with respect to the first device 710. In response to the second device 720 not being arranged in the direction that is set with respect to the first device 710 (referring to FIG. 13B), it may be difficult for the electronic device 700 to perform a function or a service provision that uses an element requiring directivity such as the camera 722 arranged in the second device 720, or cause an error of an operation thereof.

In response to identifying that the adjustment of the arrangement direction of the second device 720 with respect to the first device 710 is needed, in step 1207, the processor 716 may adjust the arrangement direction of the second device 720 with respect to the first device 710 (or the first driving device 711). Step 1205 and step 1207 are described below in greater detail with reference to FIG. 14.

Step 1205 may be replaced with an operation of distinguishing whether an arrangement direction (or a driving direction) of the first driving device 711 with respect to the second device 720 (or the second driving device 712) is needed to be adjusted as well. In this case, step 1207 may be replaced with an operation of adjusting the arrangement direction (or driving direction) of the first driving device 711 with respect to the second device 720 (or the second driving device 712). For example, referring to FIGS. 13A and 13B, the arrangement direction (or the driving direction) of the first driving device 711 is a direction orthogonal with the rotation axis 1330 of the wheels 1310 and 1320, and may indicate, for example, a forward direction or rearward direction of the first device 710 when the wheels 1310 and 1320 are driven in the same rotation condition (e.g., a rotation direction, a rotation angle, a rotation amount, a rotation speed, a rotational acceleration or a rotating angular speed). Referring to FIG. 13A, the direction of going from the center (C2) on the rotation axis 1330 between the wheels 1310 and 1320 to the set position 1321 (e.g., a position in which the camera 722 is arranged) of the second device 720 may be substantially matched with a driving direction of the first driving device 711, and in this case, the adjustment of the arrangement direction (or driving direction) of the first driving device 711 with respect to the second device 720 may not be needed. Referring to FIG. 13B, the direction of going from the center (C2) on the rotation axis 1330 between the wheels 1310 and 1320 to the set position 1321 (e.g., the position in which the camera 722 is arranged) of the second device 720 may not be matched with the driving direction of the first driving device 711, and in this case, the adjustment of the arrangement direction (or driving direction) of the first driving device 711 with respect to the second device 720 may be needed.

After initializing the arrangement direction of the second device 720 with respect to the first device 710 or the driving direction of the first driving device 711 with respect to the second device 720 by performing the method of FIG. 12, the processor 716 may provide a function or service related with the second device 720 by controlling the first driving device 711 to move the electronic device 700 or controlling the second driving device 712 to move the second device 720 on the first device 710.

Figure 14:
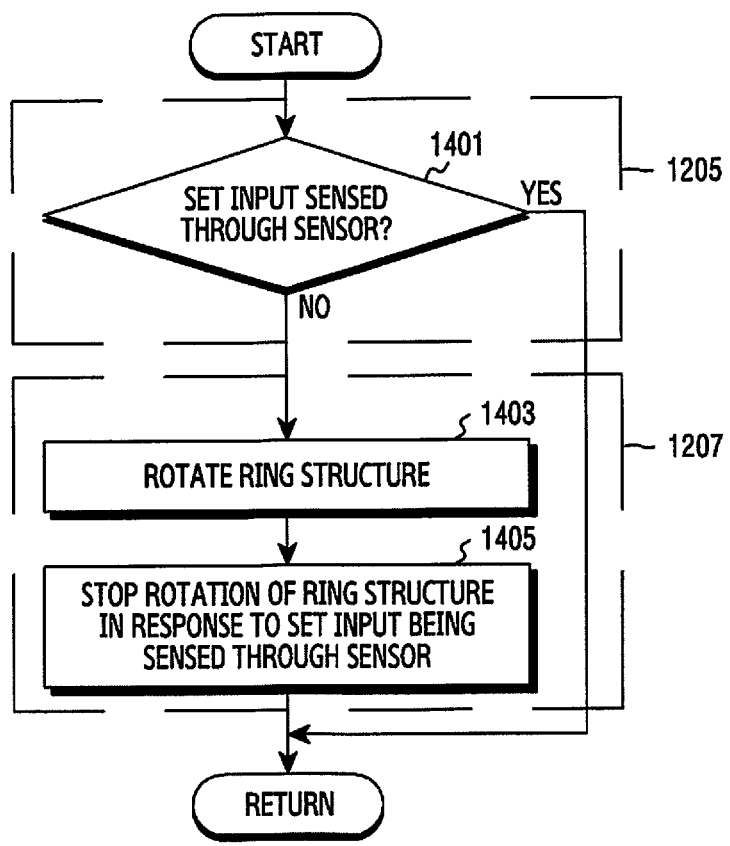
FIG. 14 is a flowchart of the steps 1205 and 1207 of FIG. 12 according to an embodiment.

FIG. 14 is a flowchart of step 1205 and step 1207 of FIG. 12 according to an embodiment. FIGS. 15, 16, 17 and 18 are illustrations of the method of FIG. 14 according to an embodiment.

Figure 15:
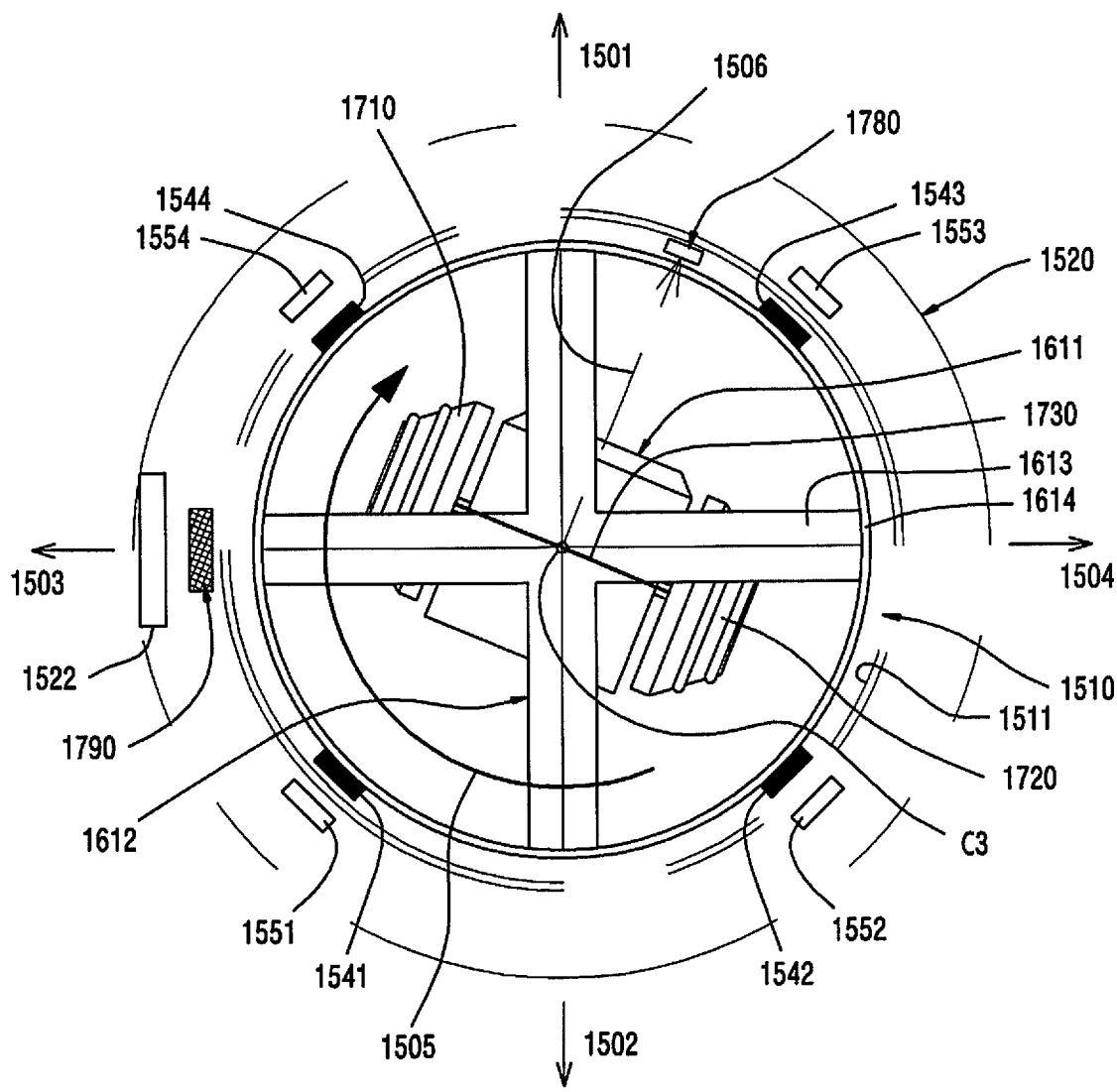
FIGS. 15, 16, 17 and 18 are illustrations of the flowchart of FIG. 14 according to an embodiment.

Referring to FIG. 15, for example, a first device 1510 may include a spherical housing 1511, and a first driving device 1611 arranged in the spherical housing 1511 and triggering a rolling motion of the spherical housing 1511. The first device 1510 may include a second driving device 1612 arranged in the spherical housing 1511. The second driving device 1612 may trigger a motion (e.g., a rotation motion or tilting motion) of a second device 1520 arranged on a surface of the first device 1510. In an embodiment, as in FIGS. 3, 4 and 5, the first device 1510 may include a plurality of first magnets 1541, 1542, 1543 and 1544 arranged in a ring structure 1613 (e.g., the ring structure 510 of FIG. 3) of the second driving device 1612. The second device 1520 may include a plurality of second magnets 1551, 1552, 1553 and 1554. Due to an attractive force or a repulsive force between the plurality of first magnets 1541, 1542, 1543 and 1544 and the plurality of second magnets 1551, 1552, 1553 and 1554, the second device 1520 may be arranged on the first device 1510 and may move together with the ring structure 1613.

The plurality of first magnets 1541, 1542, 1543 and 1544 may be arrayed (e.g., circular arrangement) on a ring plate 1614 of the ring structure 1613 along a circumference thereof at a predetermined interval (e.g., an interval of a 90-degree angle) (e.g., circular array). The plurality of first magnets 1541, 1542, 1543 and 1544 may have the mutually same first polarity (e.g., N pole or S pole), and the plurality of second magnets 1551, 1552, 1553 and 1554 may have a second polarity different from the first polarity. Thus, the second device 1520 may be arranged in four arrangement directions with respect to the first device 1510. FIG. 15 illustrates an arrangement direction of the second device 1520 in which the camera 1522 of the second device 1520 goes to the left side 1503 with a criterion of the drawing, when the second device 1520 is arranged on the first device 1510. When the second device 1520 is arranged on the first device 1510, the second device 1520 may be arranged on the first device 1510 in an arrangement direction in which the camera 1522 goes to the right side 1504, to the up side 1501 or to the down side 1502 as well.

The first device 1510 may include a sensor 1780 arranged in the first driving device 1611. The sensor 1780 may be arranged to face an inner surface 2113 of the spherical housing 1511. For example, the sensor 1780 may be arranged with a gap (e.g., 5 mm or less) of a set distance or less from the inner surface of the spherical housing 1511. When viewed from the plane, the sensor 1780 may be arranged in a direction 1506 which is substantially orthogonal with a rotation axis 1730 of a first wheel 1710 or a second wheel 1720.

The second device 1520 may include a sensor corresponding member 1790 which is positioned in alignment with the camera 1522.

Referring to FIGS. 14 and 15, in step 1401, a processor 716 of the first device 1510 may identify whether a set input is sensed through the sensor 1780. In response to the second device 1520 being arranged on the first device 1510, the sensor 1780 may not be aligned to face the sensor corresponding member 1790, and thus, it may be difficult for the sensor 1780 to output an electrical signal on the sensor corresponding member 1790. In response to the electrical signal on the sensor corresponding member 1790 not being outputted from the sensor 1780, the processor 716 may identify that a set input (or sensor data) is not sensed through the sensor 1780. In response to identifying that the set input is not sensed through the sensor 1780, the processor 716 may identify that the adjustment of an arrangement direction of the second device 1520 with respect to the first device 1510 is needed, and perform steps 1403 and 1405 for the adjustment of the arrangement direction.

In step 1403, the processor of the first device 1510 may control the second driving device 1612 to rotate the ring structure 1613 (referring to 1505). In response to the ring structure 1613 being rotated, the second device 1520 may be rotated together with the ring structure 1613, due to an attractive force between the plurality of first magnets 1541, 1542, 1543 and 1544 and the plurality of second magnets 1551, 1552, 1553 and 1554.

Figure 16:
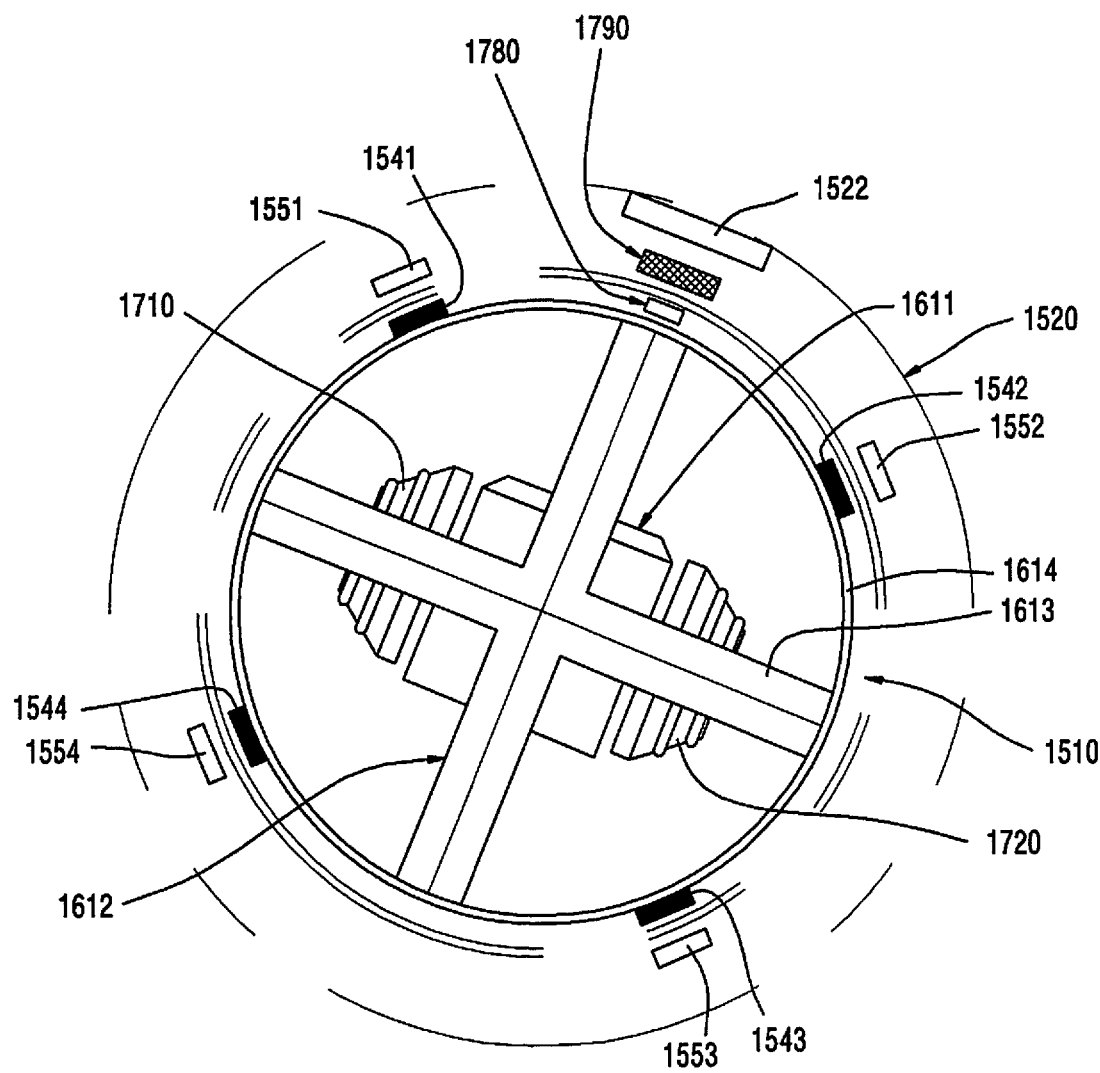

Referring to FIGS. 14, 15 and 16, in step 1405, in response to the set input being sensed through the sensor 1780, the processor of the first device 1510 may stop the rotation of the ring structure 1613 (referring to FIG. 16). In response to the sensor 1780 and the sensor corresponding member 1790 facing and aligning with each other, the sensor 1780 may output an electrical signal on the sensor corresponding member 1790, and thus, the processor 716 may sense a set input (or sensor data) through the sensor 1780.

When the second device 1520 is arranged on the first device 1510, in response to an arrangement direction of the second device 1520 with respect to the first device 1510 being formed as in FIG. 16, the sensor 1780 may be aligned with the sensor corresponding member 1790 and output the electrical signal on the sensor corresponding member 1790, thus, step 1207 may be omitted.

The sensor 1780 may be arranged in the second device 1520, and the sensor corresponding member 1790 may be implemented to be arranged in the first device 1510 as well. In response to the electrical signal on the sensor corresponding member 1790 being outputted from the sensor 1780, the processor of the second device 1520 may transmit a signal on this to the first device 1510 through a wireless communication circuit.

In step 1207, the processor 716 may drive, instead of the second driving device (e.g., the second driving device 1612 of FIG. 15), the first driving device (e.g., the first driving device 1611 of FIG. 15) for the sake of rotation of the ring structure 1613 as well.

In response to identifying that the set input is not sensed through the sensor 1780 in step 1205, the processor 716 may perform, instead of step 1207 (e.g., the adjustment of the arrangement direction of the second device with respect to the first device), an operation of adjusting the arrangement direction (or driving direction) of the first driving device 1611 with respect to the second device 1520 (or the second driving device 1612) as well. For example, referring to FIG. 15, the arrangement direction (or the driving direction) of the first driving device 1611 is a direction which is orthogonal with the rotation axis 1730 of the wheels 1710 and 1720, and may indicate, for example, a forward direction or rearward direction of the first device 1510 when the wheels 1710 and 1720 are driven in the same rotation condition (e.g., a rotation direction, a rotation angle, a rotation amount, a rotation speed, a rotational acceleration or a rotating angular speed). A direction of going from the center (C2) on the rotation axis 1730 between the wheels 1710 and 1720 to the camera 1522 of the second device 1520 may not be matched with a driving direction of the first driving device 1611, and, in this case, the adjustment of the arrangement direction (or driving direction) of the first driving device 1611 with respect to the second device 1520 (or the second driving device 1612) may be needed. The first device 1510 may control the wheels 1710 and 1720 of the first driving device 1611 instead of the second driving device 1612 to rotate the first device 1510 with respect to the second device 1520. In response to the set input being sensed through the sensor 1780 (referring to FIG. 16), the processor (e.g., the processor 716 of FIG. 7) of the first device 1510 may control the first driving device 1611 to stop the rotation of the first device 1510. In response to the sensor 1780 and the sensor corresponding member 1790 facing and aligning with each other as in FIG. 16, the sensor 1780 may output an electrical signal on the sensor corresponding member 1790, and, thus, the processor 716 may sense a set input (or sensor data) through the sensor 1780.

Figure 17:
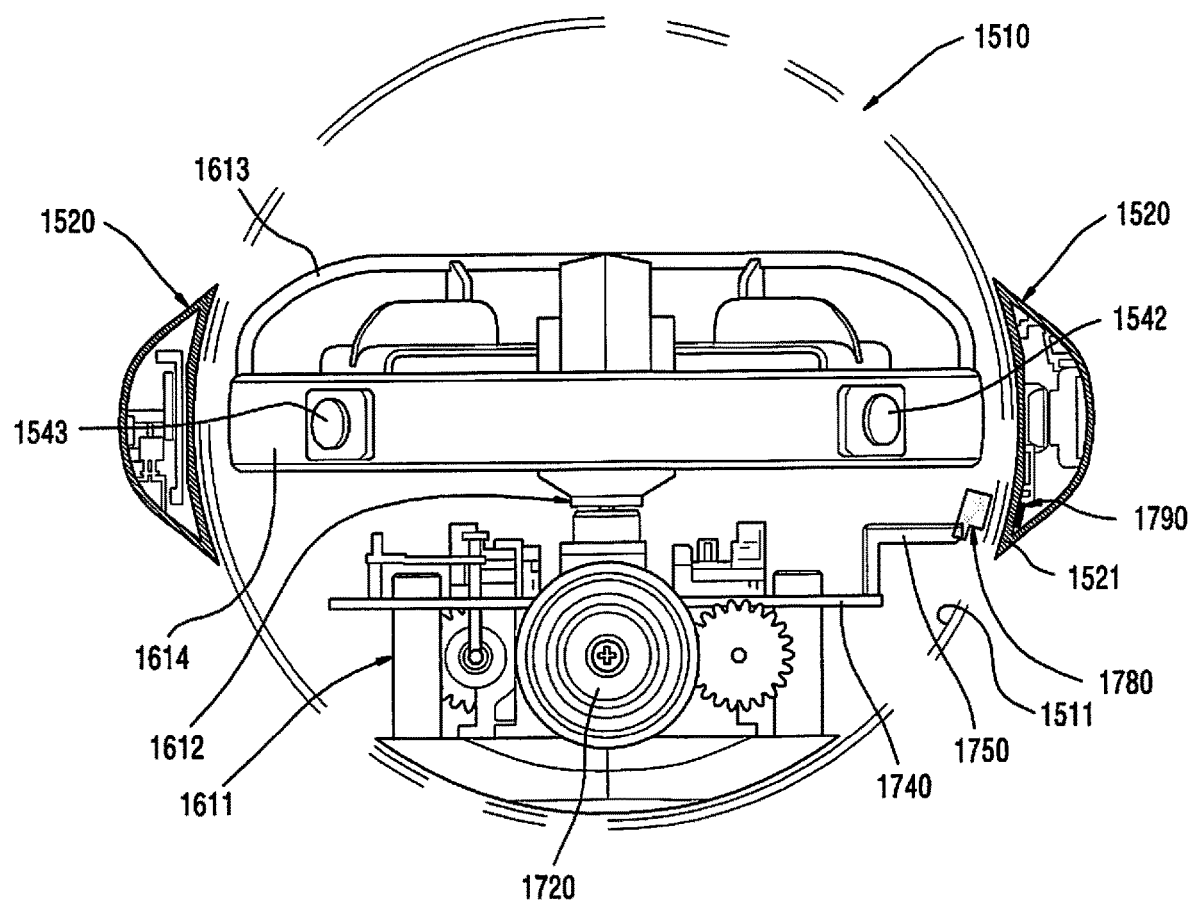

Referring to FIG. 17, the first device 1510 may include the wheel 1720, the first driving device 1611 and the second driving device 1612. The first driving device 1611 (e.g., the first driving device 330 of FIG. 3) may include a plate 1740 (e.g., the printed circuit board 430), and a support member 1750 extended from the plate 1750 or connected with the plate 1740. The sensor 1780 may be arranged in the support member 1750 to face the inner surface 2113 of the spherical housing 1511 The sensor 1780 may be arranged with a gap (e.g., 5 mm or less) of a set distance or less from the inner surface of the spherical housing 1511. The second driving device 1612 may include the ring structure 1613 (e.g., the ring structure 510 of FIG. 3), and the plurality of first magnets 1542 and 1543 arranged in the ring plate 1614 of the ring structure 1613.

The second device 1520 may include the second housing 1521 and the sensor corresponding member 1790 arranged in the second housing 1521. The sensor corresponding member 1790 may be arranged inside the second housing 1521, and be aligned to face the sensor 1780 of the first device 1510 as illustrated in FIG. 16.

The sensor 1780 may include a Hall effect IC, and the sensor corresponding member 1790 may include a magnet. In response to the Hall effect IC and the magnet facing and aligning with each other, the Hall effect IC may output an electrical signal on the magnet.

The sensor 1780 may include an optical sensor capable of obtaining light, and the sensor corresponding member 1790 may include a light source (e.g., an LED) capable of outputting light of a specified or set frequency. In response to the optical sensor and the light source facing and aligning with each other, the optical sensor may output an electrical signal on the light source. The spherical housing 1511 and the second housing 1521 may be implemented to pass the light of the specified or set frequency.

The sensor 1780 or the sensor corresponding member 1790 may be implemented as various other elements.

As in FIG. 15, the second device 1520 may be arranged on the first device 1710 in one of four arrangement directions divided by an angle of 90 degrees, but the present disclosure is not limited to this, and the second device 1520 may be implemented to be arranged on the first device 1710 in various arrangement directions divided by an angle different from 90 degrees according to positions of the magnets or the number thereof.

Figure 18:
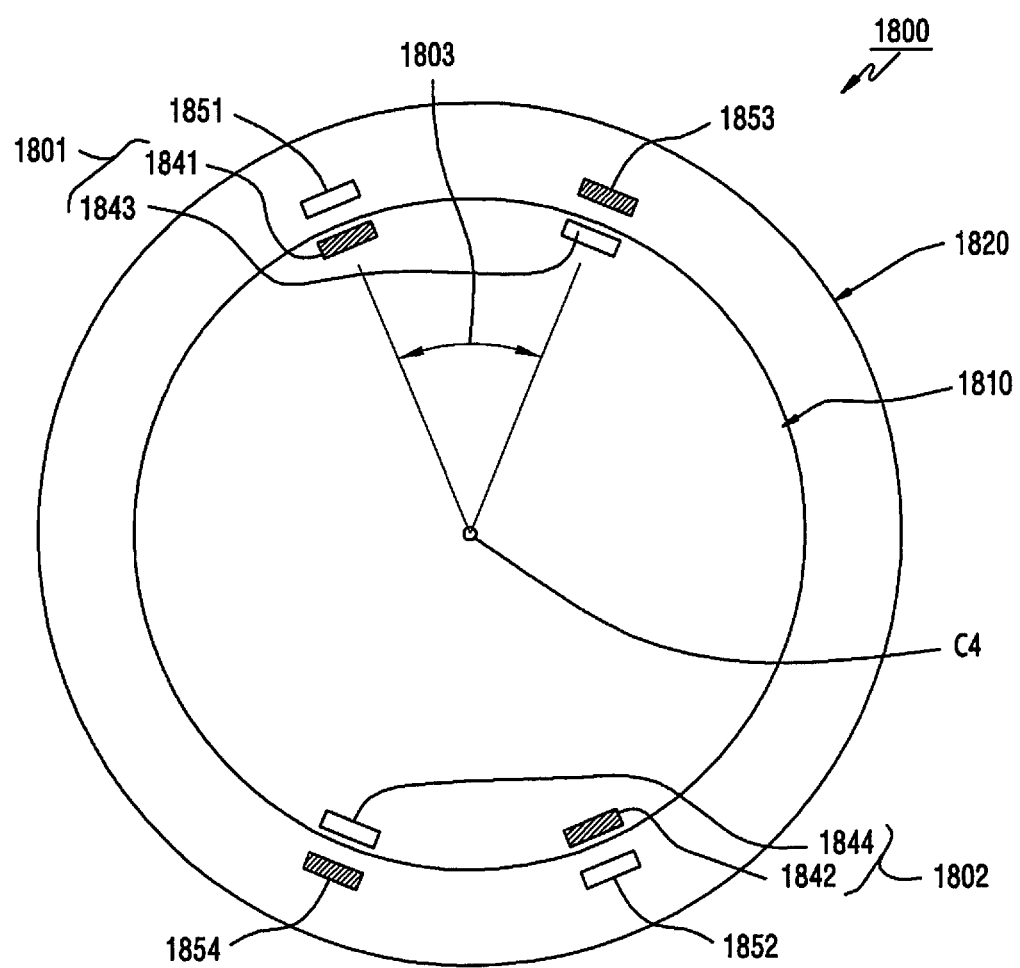

For example, referring to FIG. 18, an electronic device 1800 may include a first device 1810, and a second device 1820 (e.g., the second device 720 of FIG. 7) capable of being arranged on the first device 1810. The second device 1820 may be arranged on the first device 1810 in one of two arrangement directions divided by an angle of 180 degrees. The first device 1810 may include a plurality of first magnets 1841, 1842, 1843 and 1844. The second device 1820 may include a plurality of second magnets 1851, 1852, 1853 and 1854 prepared to correspond to the plurality of first magnets 1841, 1842, 1843 and 1844. The plurality of first magnets 1841, 1842, 1843 and 1844 may be divided into a first group 1801 and a second group 1802 which are arranged to face each other at both sides. When viewed from the plane, the first magnets 1841 and 1843 included in the first group 1801 may be arrayed at an acute angle 1803 (e.g., about 45 degrees) with a criterion of the center (C4) of a sphere (e.g., the center (C) of the sphere of FIG. 2A). The first magnets 1842 and 1844 included in the second group 1802 may be also arrayed at the same acute angle. The first magnets 1841 and 1842 arranged at mutually opposite sides may have the mutually same first polarity (e.g., N pole), and the first magnets 1843 and 1844 arranged at mutually opposite sides may have a second polarity (e.g., S pole) different from the first polarity. The plurality of second magnets 1851, 1852, 1853 and 1854 may have a polarity capable of acting attractive force with the plurality of second magnets 1841, 1842, 1843 and 1844. In response to the second device 1820 being arranged on the first device 1810, the electronic device 1800 may adjust the arrangement direction of the second device 1820 with respect to the first device 1810 through the operation flow of FIG. 14.

Figure 19:
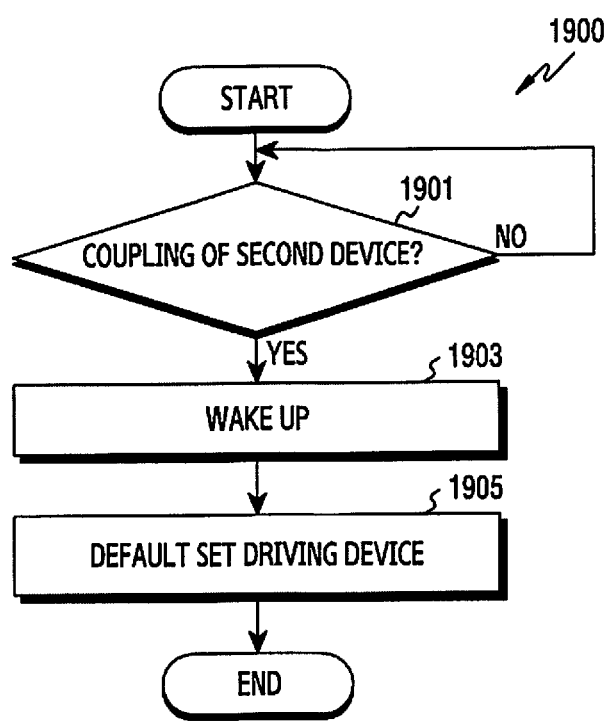
FIG. 19 is a flowchart of a method of a first device of FIG. 7 according to an embodiment.
Figure 20:
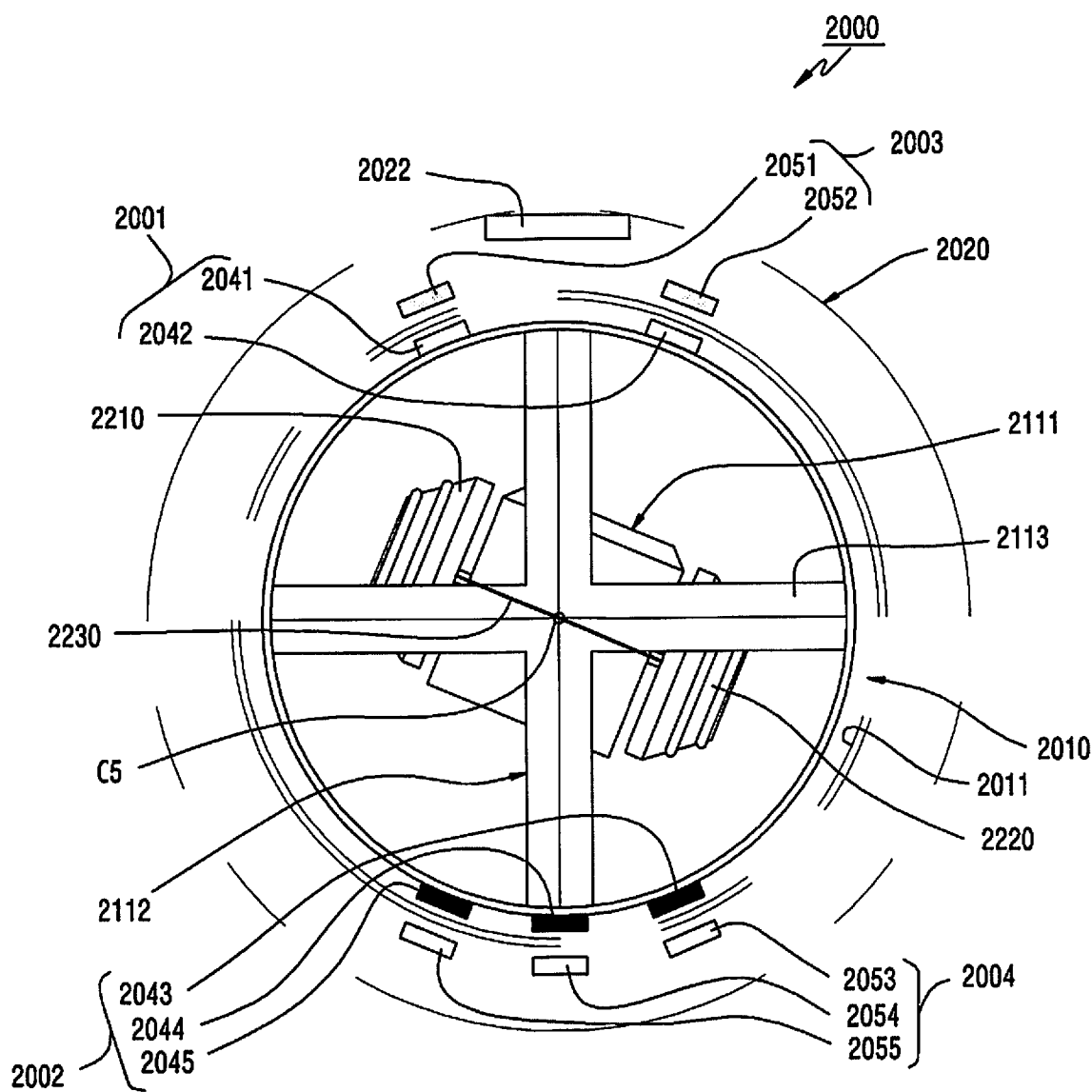
FIGS. 20 and 21 are illustrations of the method of FIG. 19 according to an embodiment.
Figure 21:
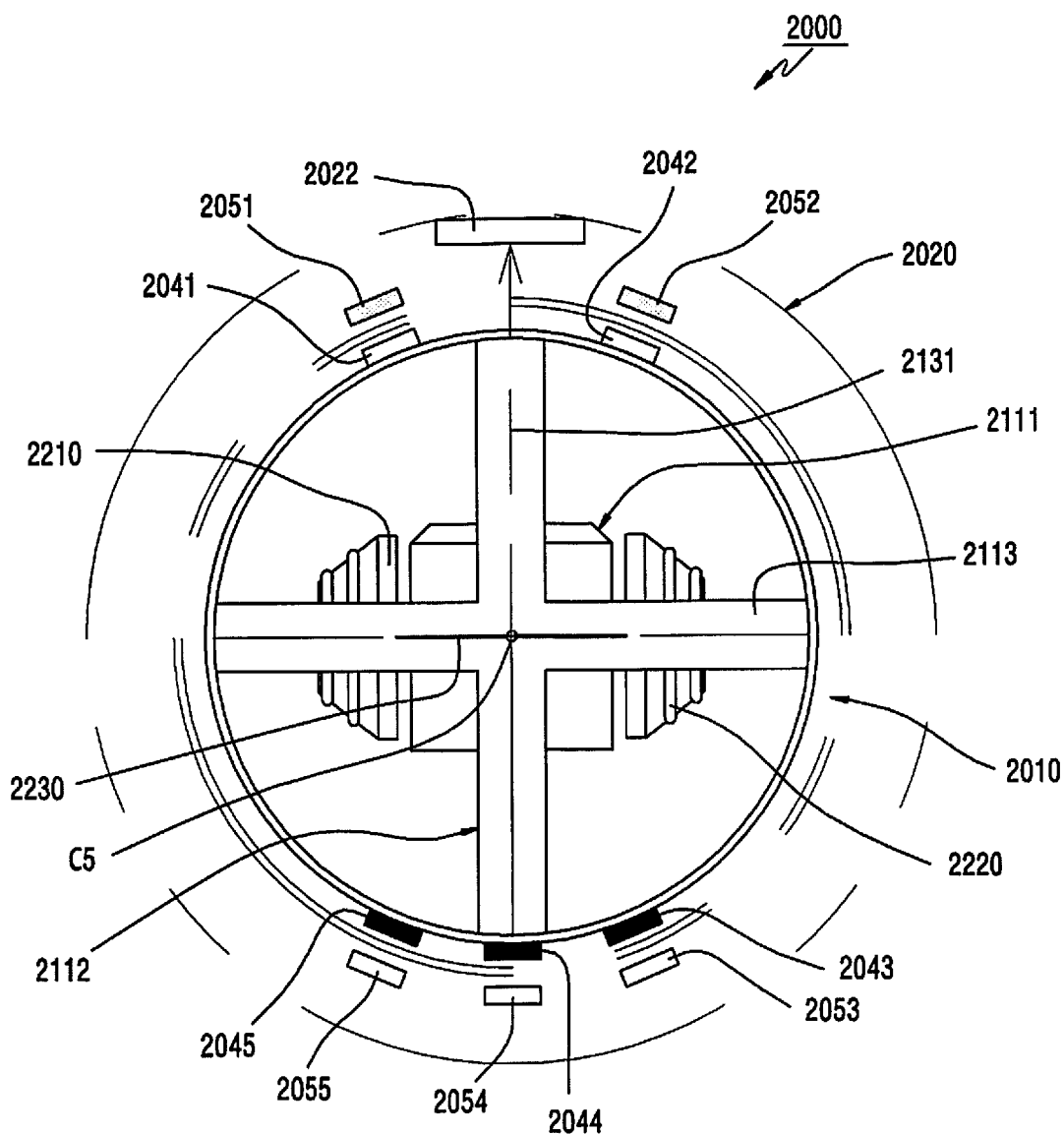

FIG. 19 is a flowchart 1900 of a method of the first device 710 of FIG. 7 according to an embodiment. FIGS. 20 and 21 are illustrations of the method of FIG. 19 according to an embodiment.

Referring to FIGS. 20 and 21, for example, a first device 2010 may include a spherical housing 2011, and a first driving device 2111 arranged in the spherical housing 2011 and triggering a rolling motion of the spherical housing 2011. The first device 2010 may include a second driving device 2112 arranged in the spherical housing 2011. The second driving device 2112 may trigger a motion (e.g., a rotation motion or tilting motion) of the second device 2020 arranged on a surface of the first device 2010. An electronic device 2000 may include an arrangement structure of a magnet prompting to, when a user arranges a second device 2020 on the first device 2010, arrange the second device 2020 in an arrangement direction which is set with respect to the first device 2010.

According to an embodiment, the first device 2010 may include a plurality of first magnets 2041, 2042, 2043, 2044 and 2045 which are arranged in a ring structure 2113 of the second driving device 2112. The plurality of first magnets 2041, 2042, 2043, 2044 and 2045 may be divided into a first group 2001 and a second group 2002 which are arranged at both sides, respectively. The first group 2001 may include magnets of a number different from that of the second group 2002. For example, the first group 2001 may include two first magnets 2041 and 2042, and the second group 2002 may include three first magnets 2043, 2044 and 2045. The first magnets 2041 and 2042 of the first group 2001 may have the same first polarity (e.g., S pole), and the first magnets 2043, 2044 and 2045 of the second group 2002 may have a second polarity (e.g., N pole) different from the first polarity. The first magnets 2041 and 2042 of the first group 2001 may have mutually different polarities. One of the first magnets 2043, 2044 and 2045 of the second group 2002 may have an N polarity, and another one may have an S polarity.

The second device 2020 may include a plurality of second magnets 2051, 2052, 2053, 2054 and 2055 prepared correspondingly to the plurality of first magnets 2041, 2042, 2043, 2044 and 2045. For example, the plurality of second magnets 2051, 2052, 2053, 2054 and 2055 may include a third group 2003 prepared correspondingly to the first group 2001, and a fourth group 2004 prepared correspondingly to the second group 2002. Each of the second magnets 2051 and 2052 included in the third group 2003 may have a polarity capable of producing an attractive force with each of the first magnets 2041 and 2042 included in the first group 2001. Each of the second magnets 2053, 2054 and 2055 included in the fourth group 2004 may have a polarity capable of producing an attractive force with each of the first magnets 2043, 2044 and 2045 included in the second group 2002.

The arrangement structure (e.g., the first group 2001, the second group 2002, the third group 2003 and the fourth group 2004) of the magnets illustrated in FIG. 20 may, when a user arranges the second device 2020 on the first device 2010, prompt an arrangement of the second device 2020 in an arrangement direction which is set with respect to the first device 2010.

The arrangement structure of the magnets illustrated in FIG. 20 is only one example, and the arrangement structure may variously prepare the number of magnets, positions thereof or polarities thereof, to when the user arranges the second device 2020 on the first device 2010, prompt an arrangement of the second device 2020 in the arrangement direction which is set with respect to the first device 2010.

FIG. 19 may be an operation flow for, in response to the second device 720 being arranged on the first device 710, initializing the arrangement direction of the second device 720 with respect to the first device 710.

Referring to FIGS. 19, 20, and 21, in step 1901, a processor 716 of the first device 2010 may identify the coupling or non-coupling of the second device 2020 with respect to the first device 2010. In an embodiment, referring to FIG. 8, the second device 2020 may transmit a wake-up signal to the first device 2010 based on a normal coupling state, and the processor 716 may identify the coupling of the second device 2020 with respect to the first device 2010 based on the received wake up signal.

In response to the coupling of the second device 2020 being identified, in step 1903, the processor may wake up, or activate, at least some elements of the first device 710 (e.g., a wake-up mode).

In step 1905, the processor (e.g., the processor 716) may default set a driving device. The default setting may indicate an operation or mode for correcting a posture (e.g., direction or angle) of the second driving device 2112 with respect to the first driving device 2111 or a posture of the first driving device 2111 with respect to the second driving device 2112, into a set initial posture. In response to default setting the first driving device 2111 or the second driving device 212, a direction of the ring structure 2113 with respect to a rotation axis 2230 of wheels 2210 and 2220 may be identified. The second device 2020 moves together with the ring structure 2113 and therefore, after the default setting, a camera 2022 may be arranged in a direction 2131 which is substantially orthogonal with the rotation axis 2230 from the center (C5) on the rotation axis 2230 between the wheels 2210 and 2220 (referring to FIG. 21). Instructions on the default setting may include a routine for enabling the processor 716 to control the first driving device 2111 or the second driving device 2112 by using at least one sensor 717.

The first device 2010 may default set the first driving device 2111 or the second driving device 2112 wherein the first device 2010 is in a state of FIG. 21 when the second device 2020 is separated from the first device 2010. In this case, step 1905 of FIG. 19 may be omitted.

After initializing the arrangement direction of the second device 2020 with respect to the first device 2010 by performing the method of FIG. 19, the processor 716 may provide a function or a service related with the second device 2020 by controlling the first driving device 2111 to move the electronic device 2000 or controlling the second driving device 2112 to move the second device 2020 on the first device 2010.

Figure 22:
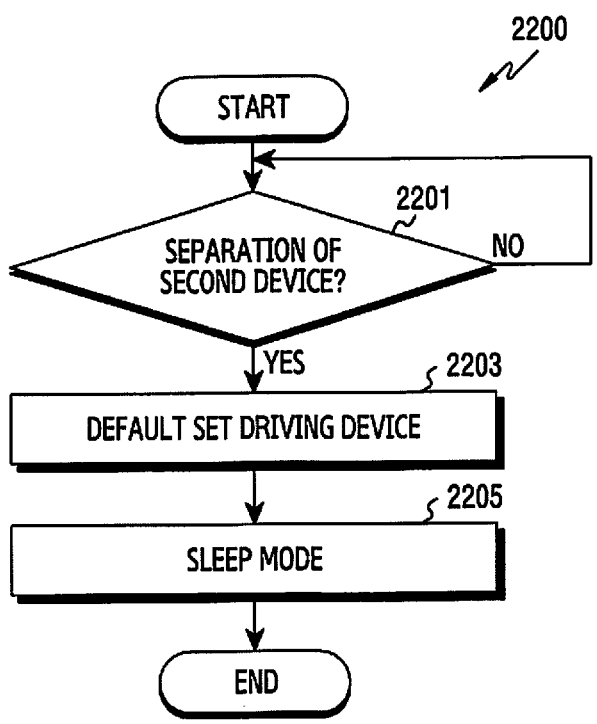
FIG. 22 is a flowchart of a method of a first device of FIG. 7 according to an embodiment.

FIG. 22 is a flow chart 2200 of a method of the first device 710 of FIG. 7 according to an embodiment.

Referring to FIGS. 7 and 22, in step 2201, the processor 716 of the first device 710 may identify a separation or a non-separation of the second device 720 with respect to the first device 710. In an embodiment, referring to FIG. 8, after sensing an abnormal coupling state, the second device 720 may transmit a signal on this to the first device 710, and the processor 716 of the first device 710 may identify the coupling of the second device 720 with respect to the first device 710 based on the signal. In response to a corresponding signal on the second device 720 not being obtained from the sensor 717, the processor 716 may identify the separation of the second device 720 with respect to the first device 710 as well. Through other various methods, the processor 716 may obtain the separation of the second device 720 with respect to the first device 710.

In step 2203, the processor 716 may default set a driving device 711 and/or 712. For example, referring to FIG. 21, when the second device 2020 is separated from the first device 2010, a posture of the second driving device 2112 with respect to the first driving device 2111 or a posture of the first driving device 2111 with respect to the second driving device 2112 may be corrected into a set initial posture. In response to default setting the first driving device 2111 or the second driving device 2112, a direction of the ring structure 2113 with respect to the rotation axis 2230 of the wheels 2210 and 2220 may be identified. The second device 2020 moves together with the ring structure 2113 and, therefore, after the default setting, the camera 2022 may be arranged in a direction 2131 which is substantially orthogonal with the rotation axis 2230 from the center (C5) on the rotation axis 2230 between the wheels 2210 and 2220 (referring to FIG. 21).

In step 2205, the processor 716 may enter a sleep mode and inactivate at least one element (e.g., the first driving device 711, the second driving device 712 or the sensor 717) of the first device 710.

In response to power of the second device 720 being off, a communication connection between the first device 710 and the second device 720 may be released, and the processor 716 may perform step 2203 and step 2205 of FIG. 22 based on the communication connection release as well.

According to an embodiment, an electronic device includes a first device having a spherical housing, and a second device arranged on a surface of the spherical housing. The first device may include a first driving device arranged in the spherical housing and capable of delivering power to the spherical housing, a structure arranged in the spherical housing and configured to arrange the second device on a surface of the spherical housing, and a second driving device triggering a movement of the structure, a processor electrically connected with the first driving device and the second driving device, and a memory operatively connected with the processor. The memory may store instructions of at execution, enabling the processor to control the second driving device to, in response to the coupling of the second device with the first device being identified, adjust an arrangement direction of the second device with respect to the first driving device.

The electronic device may further include a sensor arranged in the first driving device, and a sensor corresponding member arranged in the second device. The sensor may output an electrical signal on the sensor corresponding member in response to facing and aligning with the sensor corresponding member. The instructions may enable the processor to control the second driving device for a movement of the structure, wherein the electrical signal is outputted.

The sensor corresponding member may include a magnet, and the sensor may include a sensor for obtaining the magnet.

The instructions may further include an instruction of enabling the processor to enter a wake-up mode from a sleep mode in response to the coupling of the second device with the first device being identified.

The second device may include the one side part including a sensor, and the other side part including a sensor corresponding member. In response to the one side part and the other side part facing and coupling with each other, the sensor may output an electrical signal on the sensor corresponding member. In response to the electrical signal being sensed, the second device may transmit a signal on the coupling of the second device with the first device, to the first device.

In response to the electrical signal not being sensed, the second device may output corresponding information through a display or speaker included in the second device.

The sensor corresponding member may include a magnet, and the sensor may include a sensor for obtaining the magnet.

The second device may include the one side part including a first terminal, and the other side part including a second terminal. In response to the one side part and the other side part facing and coupling with each other, the first terminal and the second terminal may be conducted. In response to the conducting of the first terminal and the second terminal being sensed, the second device may transmit a signal on the coupling of the second device with the first device to the first device.

The first driving device may include at least one wheel, and a motor connected with the at least one wheel.

In response to an arrangement direction of the second device with respect to the first driving device being adjusted, a direction going from the center on a rotation axis between a pair of wheels to a set position on the second device may be orthogonal with the rotation axis.

The second device may include a camera arranged in the set position.

The electronic device may further include at least one first magnet arranged in the structure, and at least one second magnet arranged in the second device. The structure and the second device may move together, due to an attractive force or a repulsive force between the first magnet and the second magnet.

The at least one first magnet may include a plurality of magnets. The plurality of first magnets may face the spherical housing, to be circularly arrayed at a predetermined angle.

A structure may include a ring structure including an annular surface which is arranged to face an inner surface of the spherical housing.

The second device may have a ring shape which is arranged along the annular surface.

The second driving device may be arranged between the ring structure and the first driving device, and may include at least one motor connected with the ring structure.

According to an embodiment, an electronic device includes a first device having a spherical housing, and a second device arranged on a surface of the spherical housing. The first device may include a first driving device arranged in the spherical housing and capable of delivering power to the spherical housing, a structure arranged in the spherical housing and configured to arrange the second device on a surface of the spherical housing, a second driving device triggering a movement of the structure, and a plurality of first magnets arranged in the structure. The second device may include a ring shaped housing arranged along the spherical housing, and a plurality of second magnets arranged in the ring shaped housing along a surface of the spherical housing. The structure and the second device may move together, due to an attractive force or a repulsive force between the plurality of first magnets and the plurality of second magnets. Some of the plurality of first magnets may be arrayed at an interval different from that of other portions.

The first device may further include a processor electrically connected with the first driving device and the second driving device, and a memory operatively connected with the processor. The memory may store instructions of an execution, enabling the processor to default set the first driving device and the second driving device in response to the coupling of the second device with the first device being identified. The default setting may correct a posture of the second driving device with respect to the first driving device or a posture of the first driving device with respect to the second driving device, into an initial posture.

The memory may store instructions of at execution, enabling the processor to, after default setting the first driving device and the second driving device, enter a sleep mode in response to the separating of the second device from the first device being identified.

The second device may include the one side part including a sensor, and the other side part including a sensor corresponding member. In response to the one side part and the other side part facing and coupling with each other, the sensor may output an electrical signal on the sensor corresponding member. In response to the electrical signal being sensed, the second device may transmit a signal on the coupling of the second device with the first device, to the first device. The first device may enter a wake-up mode from a sleep mode in response to receiving the signal on the coupling of the second device with the first device.

Various embodiments of the present disclosure disclosed in the specification and accompanying drawings are merely examples so as to easily explain the present disclosure and assist in the understanding of the present disclosure, but are not intended to limit the scope of the present disclosure. Accordingly, the scope of the present disclosure should be construed as all modified or changed forms drawn based on the scope of the present disclosure as defined by the appended claims and their equivalents.

What is claimed is:

1. An electronic device, comprising:
a first device having a spherical housing; and
a second device arranged on a surface of the spherical housing,
wherein the first device comprises:
a first driving device arranged in the spherical housing and configured to deliver power to the spherical housing;
a structure arranged in the spherical housing and configured to arrange the second device on a surface of the spherical housing;
a second driving device configured to trigger a movement of the structure;
a processor electrically connected with the first driving device and the second driving device; and
a memory operatively connected with the processor,
wherein the memory is configured to store instructions that, when executed, enable the processor to control the second driving device to, in response to identifying a coupling of the second device with the first device, adjust an arrangement direction of the second device with respect to the first driving device.

2. The electronic device of claim 1, further comprising:
a sensor arranged in the first driving device; and
a sensor corresponding member arranged in the second device,
wherein the sensor is configured to output an electrical signal on the sensor corresponding member in response to facing and aligning with the sensor corresponding member, and
wherein the memory is further configured to store instructions, when executed, enable the processor to control the second driving device for a movement of the structure, wherein the electrical signal is outputted.

3. The electronic device of claim 2, wherein the sensor corresponding member comprises a magnet, and
the sensor comprises a sensor for obtaining the magnet.

4. The electronic device of claim 1, wherein the memory is further configured to store an instruction, when executed, that enables the processor to enter a wake-up mode from a sleep mode in response to the identification of coupling of the second device with the first device.

5. The electronic device of claim 1, wherein the second device comprises:
a one side part comprising a sensor; and
another side part comprising a sensor corresponding member,
wherein, the sensor is configured to, in response to the one side part and the another side part facing and coupling with each other, output an electrical signal on the sensor corresponding member, and, in response to the electrical signal being sensed, transmit a signal on the coupling of the second device with the first device to the first device.

6. The electronic device of claim 5, wherein the second device is configured to, in response to the electrical signal not being sensed, output corresponding information through a display or a speaker in the second device.

7. The electronic device of claim 5, wherein the sensor corresponding member comprises a magnet, and
the sensor comprises a sensor for obtaining the magnet.

8. The electronic device of claim 1, wherein the second device comprises:
a one side part comprising a first terminal; and
another side part comprising a second terminal,
wherein the first terminal is configured to, in response to the one side part and the another side part facing and coupling with each other, cause conduction between the first terminal and the second terminal, and
in response to sensing conduction between the first terminal and the second terminal, transmit a signal on the coupling of the second device with the first device to the first device.

9. The electronic device of claim 1, wherein the first driving device comprises:
at least one wheel, and
a motor connected with the at least one wheel.

10. The electronic device of claim 9, wherein the first driving device, in response to determining that an arrangement direction of the second device with respect to the first driving device is required to be adjusted, is further configured to cause a direction going from the center on a rotation axis between a pair of wheels to a set position on the second device to be orthogonal with the rotation axis.

11. The electronic device of claim 10, wherein the second device comprises a camera arranged in the set position.

12. The electronic device of claim 1, further comprising:
at least one first magnet arranged in the structure; and
at least one second magnet arranged in the second device,
wherein the structure is further configured to move together with the second device, due to an attractive force or a repulsive force between the first magnet and the second magnet.

13. The electronic device of claim 12, wherein the at least one first magnet comprises a plurality of magnets, and
the plurality of magnets faces the spherical housing, to be circularly arrayed at a predetermined angle.

14. The electronic device of claim 1, wherein the structure comprises a ring structure comprising an annular surface arranged to face an inner surface of the spherical housing.

15. The electronic device of claim 14, wherein the second device is configured in a ring shape arranged along the annular surface.

16. The electronic device of claim 14, wherein the second driving device is arranged between the ring structure and the first driving device and comprises at least one motor connected with the ring structure.

17. An electronic device, comprising:
a first device having a spherical housing; and
a second device arranged on a surface of the spherical housing,
wherein the first device comprises:
a first driving device arranged in the spherical housing and configured to deliver power to the spherical housing;
a structure arranged in the spherical housing and configured to arrange the second device on a surface of the spherical housing;
a second driving device configured to trigger a movement of the structure; and
a plurality of first magnets arranged in the structure,
wherein the second device comprises:
a ring shaped housing arranged along the spherical housing; and
a plurality of second magnets arranged in the ring shaped housing along a surface of the spherical housing,
wherein the structure is further configured to move together with the second device, due to an attractive force or a repulsive force between the plurality of first magnets and the plurality of second magnets, and wherein some of the plurality of first magnets are arrayed at an interval different from that of other portions of the plurality of first magnets.

18. The electronic device of claim 17, wherein the first device further comprises:

a processor electrically connected with the first driving device and the second driving device; and a memory operatively connected with the processor, wherein the memory is configured to store instructions, when executed, that enable the processor to default set the first driving device and the second driving device in response to identifying coupling of the second device with the first device, and wherein the default setting corrects a posture of the second driving device with respect to the first driving device, or a posture of the first driving device with respect to the second driving device, to an initial posture.

19. The electronic device of claim 17, wherein the first device further comprises:

a processor electrically connected with the first driving device and the second driving device; and a memory operatively connected with the processor, wherein the memory is configured to store instructions, when executed, that enable the processor to, after default setting of the first driving device and the second driving device, enter a sleep mode in response to identifying separation of the second device from the first device, and wherein the default setting corrects a posture of the second driving device with respect to the first driving device, or a posture of the first driving device with respect to the second driving device, to an initial posture.

20. The electronic device of claim 17, wherein the second device comprises:

a one side part comprising a sensor; and another side part comprising a sensor corresponding member, wherein, in response to the one side part and the other side part facing and coupling with each other, the sensor is configured to output an electrical signal on the sensor corresponding member, and, in response to the electrical signal being sensed, transmit a signal on the coupling of the second device with the first device to the first device, and wherein the first device is configured to enter a wake-up mode from a sleep mode in response to receiving the signal on the coupling of the second device with the first device.

* * * * *

UNITED STATES PATENT AND TRADEMARK OFFICE
CERTIFICATE OF CORRECTION

| | | |
|---|---|---|
| PATENT NO. | : 11,220,256 B2 | Page 1 of 1 |
| APPLICATION NO. | : 16/751780 | |
| DATED | : January 11, 2022 | |
| INVENTOR(S) | : Eunsu Jeong et al. | |

It is certified that error appears in the above-identified patent and that said Letters Patent is hereby corrected as shown below:

On the Title Page

Add:
(30) Foreign Application Priority Data
January 24, 2019 .......... KR ............... 10-2019-0009277

Signed and Sealed this
Twenty-sixth Day of April, 2022

Katherine Kelly Vidal
*Director of the United States Patent and Trademark Office*